United States Patent
Komura et al.

(10) Patent No.: US 7,157,175 B2
(45) Date of Patent: Jan. 2, 2007

(54) SOLID POLYMER ELECTROLYTE MEMBRANE FUEL CELL ELECTRODE CATALYST LAYER

(75) Inventors: Takashi Komura, Wako (JP); Yoichi Asano, Wako (JP); Masahiro Ise, Wako (JP); Ryoichiro Takahashi, Wako (JP); Hiromichi Yoshida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 612 days.

(21) Appl. No.: 10/720,279

(22) Filed: Nov. 25, 2003

(65) Prior Publication Data

US 2004/0106515 A1    Jun. 3, 2004

(30) Foreign Application Priority Data

Nov. 29, 2002   (JP)   ............................ P2002-349021

(51) Int. Cl.
   H01M 4/86   (2006.01)
   H01M 4/90   (2006.01)
   H01M 4/96   (2006.01)
   B01J 31/00  (2006.01)

(52) U.S. Cl. ........................ 429/40; 429/41; 502/159

(58) Field of Classification Search ...................... None
   See application file for complete search history.

(56) References Cited

U.S. PATENT DOCUMENTS

2004/0121221 A1 *   6/2004   Suzuki et al. .................. 429/44
2005/0112451 A1 *   5/2005   Lee et al. ...................... 429/44

FOREIGN PATENT DOCUMENTS

JP          6-275282          9/1994

* cited by examiner

*Primary Examiner*—Patrick Joseph Ryan
*Assistant Examiner*—Robert Hodge
(74) *Attorney, Agent, or Firm*—Arent Fox PLLC

(57) ABSTRACT

A solid polymer electrolyte membrane fuel cell electrode catalyst layer comprises Pt particles carried on a carbon carrier and a solid polymer electrolyte, wherein a center-to-center distance dimension (Lpt–pt) between the Pt particles carried on the carbon carrier is made to substantially coincide with the sum of a double of a total dimension resulting by adding the length (Lpes) of a side chain having an ion-exchange group to the diameter (Dpem) of a main chain of the solid polymer electrolyte and the diameter (Dpt) of the Pt particle.

10 Claims, 16 Drawing Sheets

Pt CARRYING CARBON

ELECTROLYTE FILMED Pt CARRYING CARBON

Pt PARTICLE DIAMETER COVERED 1.3nm WITH PE

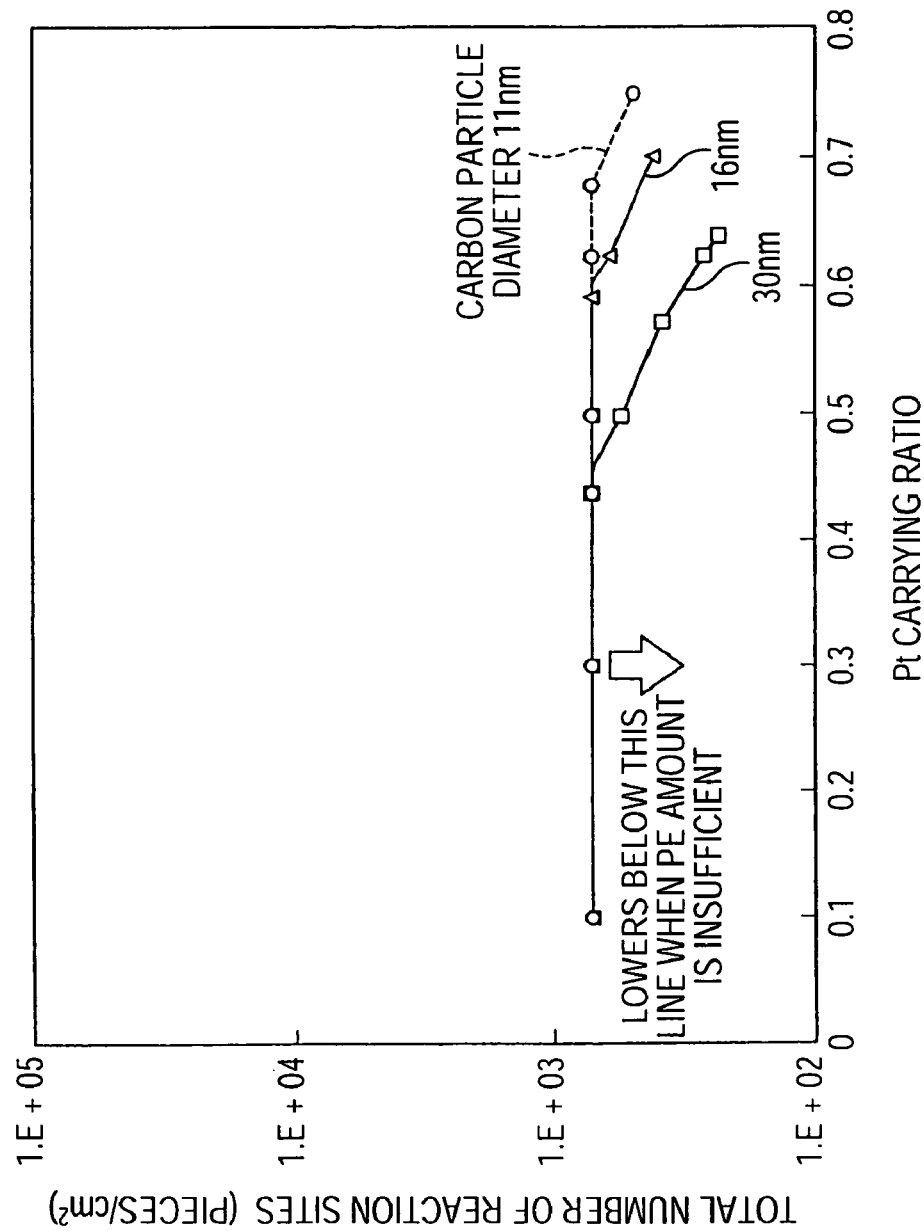

SOLID POLYMER ELECTROLYTE MEMBRANE FUEL CELL ELECTRODE CATALYST LAYER

BACKGROUND OF THE INVENTION

1. Field of the Invention

The present invention relates to the improvement of an electrode catalyst layer which attempts to improve the performance of an MEA (Membrane Electrode Assembly) of a solid polymer electrolyte membrane fuel cell, and more particularly to a technique of optimizing the dimensional specification of an electrode constituting material for reducing a reaction loss at an electrode.

2. Description of the Related Art

In the related art, Pt catalysts and solid polymer electrolytes have been used as basic constituent materials for electrode catalyst layers for solid polymer electrolyte membrane fuel cells. While the electrode catalyst layer is an important constituent structure which governs the power generating reaction, since there is caused a loss associated with a reaction referred to as an activated excess voltage, in order to reduce the loss, better combinations thereof have been attempted to be found on an try-and-select basis by preparing variously kinds of Pt catalysts and polymer electrolytes, mixing and distributing amounts thereof and mixing methods.

As one of related arts to the preparation of electrode layers of the solid polymer electrolyte membrane fuel cells, there is known, for example, a fuel cell in which an electrode and a solid electrolyte membrane are prevented from drying by making a gas diffusing electrode hydrophilic so as to make efficient use of water produced from a reaction at the air electrode to thereby improve the cell output characteristics (refer to JP-A-6-275282 (Pages 3 to 4, FIG. 1))

However, since no basic direction for reducing the loss during the electrode reaction has not yet been found, it has resulted that various kinds of catalysts and various combinations of polymer electrolytes are prepared on a try-and-select basis to select the best among what have been tried. Consequently, there is caused a problem that nobody knows whether or not what is so selected is optimal. As a result, despite the fact that lots of efforts have been made on the try-and-select basis over many years, there has been provided no rapid improvement in the performance.

It is a common knowledge among those skilled in this technical field that the surface area of the catalyst such as platinum only has to be increased in order to improve the performance. Therefore, it follows that in case the amount of platinum that is used is the same, the surface area can be increased by reducing the particle diameter of platinum used. In reality, however, the try-and-select approach has not always resulted in a rapid improved in the performance.

In addition, while the amount of platinum used has been tried to be reduced since it is expensive, no sufficient performance has been obtained.

SUMMARY OF THE INVENTION

Consequently, a main object of the invention is to provide a solid polymer electrolyte membrane fuel cell electrode catalyst layer which is optimized with respect to the specification thereof, or, in other words, which is designed to have optimal dimensions so as to have a better reactivity to thereby improve the power generating performance thereof or so as to maintain or improve the power generating performance thereof even if the amount of catalyst particles used such as platinum is reduced.

With a view to solving the problem, according to a first aspect of the invention, there is provided a solid polymer electrolyte membrane fuel cell electrode catalyst layer comprising: catalyst particles carried on a catalyst carrier; and a solid polymer electrolyte, wherein a center-to-center distance dimension ($L_{pt-pt}$) between the catalyst particles carried on the catalyst carrier is made to substantially coincide with the sum of a double of a total dimension resulting by adding the length ($L_{pes}$) of a side chain having an ion-exchange group to the radius ($D_{pem}/2$) of a main chain of the solid polymer electrolyte and the diameter ($D_{pt}$) of the catalyst particle.

According to a second aspect of the invention, there is provided a solid polymer electrolyte membrane fuel cell electrode catalyst layer as set forth in the first aspect of the invention, wherein the diameter ($D_c$) of the catalyst carrier, the diameter ($D_{pt}$) of the catalyst particle, the radius ($D_{pem}/2$) of the main chain of the solid polymer electrolyte, the length ($L_{pes}$) of the side chain having an ion-exchange group and a catalyst carrying weight ratio ($WR_{pt}$) of the catalyst particle carried on the catalyst carrier are such as to substantially satisfy the following equation;

$$L_{pt-pt} = D_{pt} + 2(0.5\ D_{pem} + L_{pes}) = \sqrt{(2 \cdot \Delta S_c / 3\ \tan 30°)}$$

$$\Delta S_c = \pi \cdot \sigma_{pt} \cdot D_{pt}^3 / \sigma_c \cdot D_c (1/WR_{pt} - 1) = \pi \cdot D_c^2 / N_{pt}.$$

According to a third aspect of the invention, there is provided a solid polymer electrolyte membrane fuel cell electrode catalyst layer as set forth in the first or second aspect of the invention, wherein the amount of the solid polymer electrolyte is such as to cover the catalyst particle substantially entirely.

According to a fourth aspect of the invention, there is provided a solid polymer electrolyte membrane fuel cell electrode catalyst layer as set forth in any of the first to third aspects of the invention, wherein the catalyst carrier is a carbon carrier and the diameter ($D_c$) of the catalyst carrier is 30 nm or smaller, wherein the catalyst particle is a Pt particle and the diameter ($D_{pt}$) of the catalyst particle ranges from 0.6 nm or greater to 2.0 nm or smaller, and wherein a catalyst carrying weight ratio ($WR_{pt}$) of the catalyst particle carried on the catalyst carrier is 30 wt % or smaller.

According to a fifth aspect of the invention, there is provided a solid polymer electrolyte membrane fuel cell electrode catalyst layer as set forth in the fourth aspect of the invention, wherein the solid polymer electrolyte is formed from perfluorosulfonic acid.

According to a sixth aspect of the invention, there is provided a solid polymer electrolyte membrane fuel cell electrode catalyst layer as set forth in the fifth aspect of the invention, wherein the length ($L_{pes}$) of the side chain of the solid polymer electrolyte is 1 nm or smaller, and wherein the length of a unit main chain of the solid polymer electrolyte is 3 nm or smaller.

According to a seventh aspect of the invention, there is provided a solid polymer electrolyte membrane fuel cell electrode catalyst layer as set forth in any of the first to third aspects of the invention, wherein a ratio of a total number of the ion-exchange groups in the solid polymer electrolyte which contact the catalyst particles relative to a total volume of the catalyst carrier is made to become maximum.

According to an eighth aspect of the invention, there is provided a solid polymer electrolyte membrane fuel cell electrode catalyst layer as set forth in the seventh aspect of the invention, wherein the catalyst carrier is a carbon carrier and the diameter (Dc) of the catalyst carrier is smaller than 30 nm, wherein the catalyst particle is a Pt particle and the diameter (Dpt) of the catalyst particle ranges from 1 nm or greater to 4 nm or smaller, and wherein the catalyst carrying weight ratio (WRpt) ranges from 30 mass % or greater to 70 mass % or smaller.

According to a ninth aspect of the invention, there is provided a solid polymer electrolyte membrane fuel cell electrode catalyst layer as set forth in the eighth aspect of the invention, wherein the solid polymer electrolyte is formed from perfluorosulfonic acid.

According to a tenth aspect of the invention, there is provided a solid polymer electrolyte membrane fuel cell electrode catalyst layer as set forth in the ninth aspect of the invention, wherein the length (Lpes) of the side chain of the solid polymer electrolyte is 1 nm or smaller, and wherein the length of a unit main chain of the solid polymer electrolyte is 3 nm or smaller.

Thus, according to the configurations of the invention, it becomes possible to provide a solid polymer electrolyte membrane fuel cell electrode catalyst layer which is optimized with respect to the specification thereof, or, in other words, which is designed to have optimal dimensions so as to improve the reactivity thereof to thereby improve the power generating performance thereof or so as to maintain or improve the power generating performance thereof even if the amount of catalyst particles used such as platinum is reduced.

BRIEF DESCRIPTION OF THE DRAWINGS

FIG. 7 is a graph illustrating a relation between a Pt carrying ratio and the total number $Nt^+$ of reaction sites per unit area;

DETAILED DESCRIPTION OF THE INVENTION

Referring to the accompanying drawings, embodiments of solid polymer electrolyte membrane fuel cell electrode catalyst layers will be described in detail below.

Note that while, in the respective embodiments, a catalyst carrier is described as a carbon carrier, a catalyst particle as a Pt particle and a solid polymer electrolyte as being formed from a perfluorosulfonic acid, the invention is not limited thereto.

(First Embodiment)

According to a first embodiment of the invention, there is provided a solid polymer electrolyte membrane fuel cell electrode catalyst layer(hereinafter, also referred to as an "electrode catalytic layer" from time to time), characterized in that a center-to-center distance dimension (Lpt–pt) between Pt particles carried on a carbon carrier is made to substantially coincide with the sum of a double of a total dimension resulting by adding the length (Lpes) of a side chain having an ion-exchange group to a half of the diameter (Dpem) of a main chain of a solid polymer electrolyte (hereinafter, also referred to as a "polymer electrolyte" from time to time) and the diameter (Dpt) of the Pt particle.

Namely, the first embodiment provides an electrode catalyst layer which satisfies the following equation;

$$Lpt{-}pt{=}Dpt{+}2(0.5\ Dpem{+}Lpes) \tag{11}$$

The first embodiment will be described below based on FIG. 1.

Figure 1A:
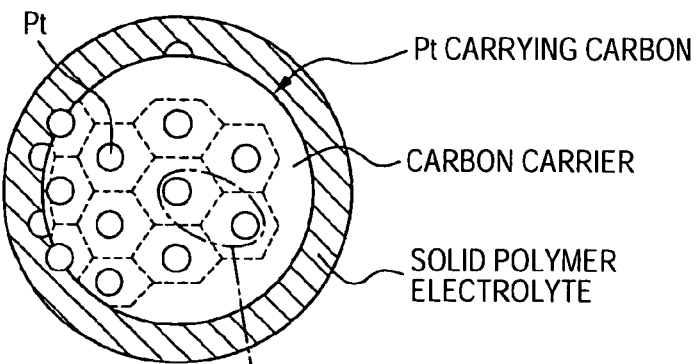
FIG. 1A is a diagram explaining a concept of a first embodiment of the invention, in which it illustrates diagrammatically a relation among a carbon carrier, a Pt, a solid polymer electrolyte and a platinum carrying carbon.
Figure 1B:
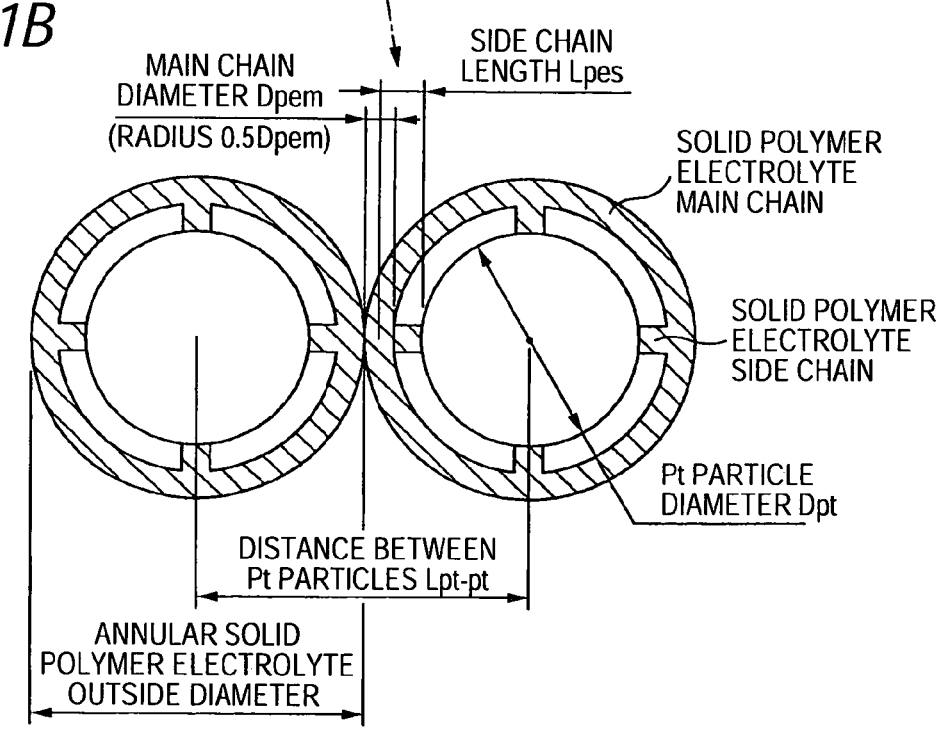
FIG. 1B is a diagram explaining a concept of a first embodiment of the invention, in which it illustrates diagrammatically a relation between a positional relation between Pt particles and the solid electrolyte.
Figure 1C:
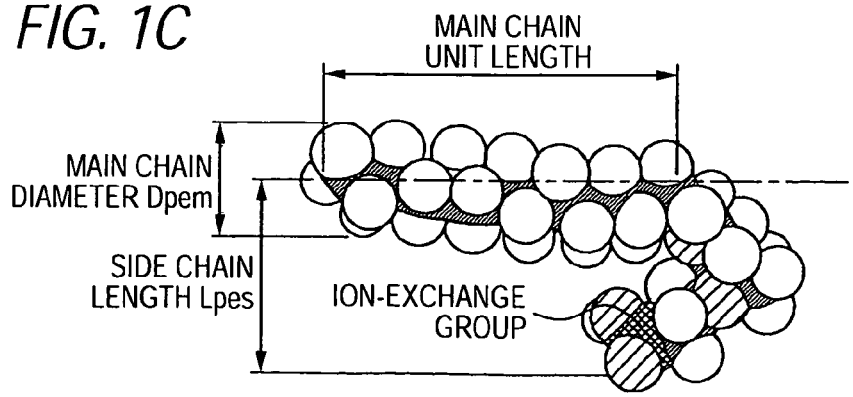
FIG. 1C is a diagram explaining a concept of a first embodiment of the invention, in which it illustrates diagrammatically a main chain diameter, a side chain length and an ion-exchange group in the solid polymer electrolyte.

FIG. 1 shows diagrams explaining a concept of the first embodiment, in which FIG. 1A illustrates diagrammatically a relation among a carbon carrier, a Pt catalyst (hereinafter, referred to as a "Pt"), a solid polymer electrolyte and a catalyst carrier carbon (hereinafter, referred to as a "Pt carrying carbon"), FIG. 1B illustrates diagrammatically a relation between a positional relation between Pt particles and the solid electrolyte, and FIG. 1C illustrates diagrammatically a main chain diameter, a side chain length and an ion-exchange group.

As shown in FIG. 1A, the electrode catalyst layer according to the first embodiment includes Pts (also referred to as "Pt particles" from time to time) carried on a carbon carrier (also referred to as a "carbon particle") and a platinum carrying carbon (also referred to as a "Pt carrying carbon") formed as a result of the Pts being carried on the carbon carrier like this. The Pts are disposed at predetermined intervals (Lpt–pt) on the carbon carrier.

The surfaces of the Pt particles shown in FIG. 1B are covered with the solid polymer electrolyte (a single-layer membrane), and the solid polymer electrolyte is configured such that a side chain (a side chain having an ion-exchange group) thereof contacts the Pt particle. In addition, the Pt particles contact each other with two solid polymer electrolyte main chains being interposed therebetween. Note that FIG. 1B illustrates diagrammatically a Pt particulate diameter Dpt, main chain diameter Dpem, a side chain length Lpes and a center-to-center distance Lpt–pt. In addition, here, a main chain diameter Dpem and side chain length Lpes of the solid polymer electrolyte are defined as shown in FIG. 1C. Furthermore, the structure of the solid polymer electrolyte will be expressed by the following chemical equation (1).

Molecular Formula of Perfluorosulfonic Acid

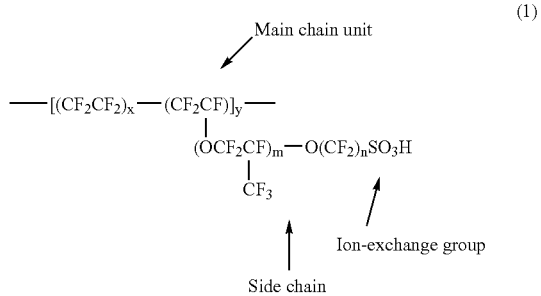

In this structure, a portion where an ion-exchange group provided on the side chain and the Pt particle constitutes an activation site. As will be described in detail later on, in order to increase the number of activation sites, it will be better that the main chain has a shorter repeating unit length. This is because even if the length of the solid polymer electrolyte remains the same, the number of ion-exchange groups is increased when the main chain has a shorter repeating unit length. In addition, it is better that the length (Lpes) of the side chain is shorter. This is because a distance between the Pt particles (Lpt–pt) can be shortened so that more Pts can be disposed on the carbon carrier. In addition, it is better that the diameter of the Pt particle is smaller. This is because the Pt particles (Lpt–pt) can be shortened so that more Pts can be disposed on the carbon carrier.

According to the first embodiment, at the electrode of the fuel cell, a path (a three phase interface) for gases (hydrogen/oxygen), ions ($H^+$) and electrons ($e^-$) can be secured, and the number of activation sites can be increased, whereby the performance of the electrode catalyst layer is improved. In addition, the equation (11) according to the first embodiment provides an optimized specification for the electrode catalyst layer, whereby the reactivity can be made better so as to improve the power generating performance or so as to maintain or improve the power generating performance even if the amount of Pt (the amount of platinum) is reduced (namely, the amount of Pt can be attempted to be optimized).

Note that the word "substantially", when used in the specification, means a rage from 0.7 to 1.3 or preferably from 0.95 to 1.05 of a certain value (a target value). Sufficient results in designing catalysts can be obtained within these ranges.

(Second Embodiment)

According to a second embodiment of the invention, there is provided a solid polymer electrolyte membrane fuel cell electrode catalyst layer as set forth in the first embodiment of the invention, wherein the diameter (Dc) of the carbon carrier, the diameter (Dpt) of the Pt particle, the diameter (Dpem) of the main chain of the solid polymer electrolyte, the length (Lpes) of the side chain having an ion-exchange group and a Pt carrying weight ratio (WRpt) of the Pt particle carried on the carbon carrier are such as to substantially satisfy the following equations.

$$Lpt\text{–}pt = Dpt + 2(0.5Dpem + Lpes) \tag{21}$$

$$= \sqrt{(2 \cdot \Delta Sc/3 \, \tan 30°)} \tag{22}$$

$$\Delta Sc = \pi \cdot \sigma pt \cdot Dpt^3 / \sigma c \cdot Dc(1/WRpt - 1) \tag{23}$$

$$= \pi \cdot Dc^2 / Npt \tag{24}$$

The second embodiment will be described based on the respective equations and FIG. 2. Note that the equation (21) is an identical equation to the equation (11) described in the first embodiment.

Figure 2:
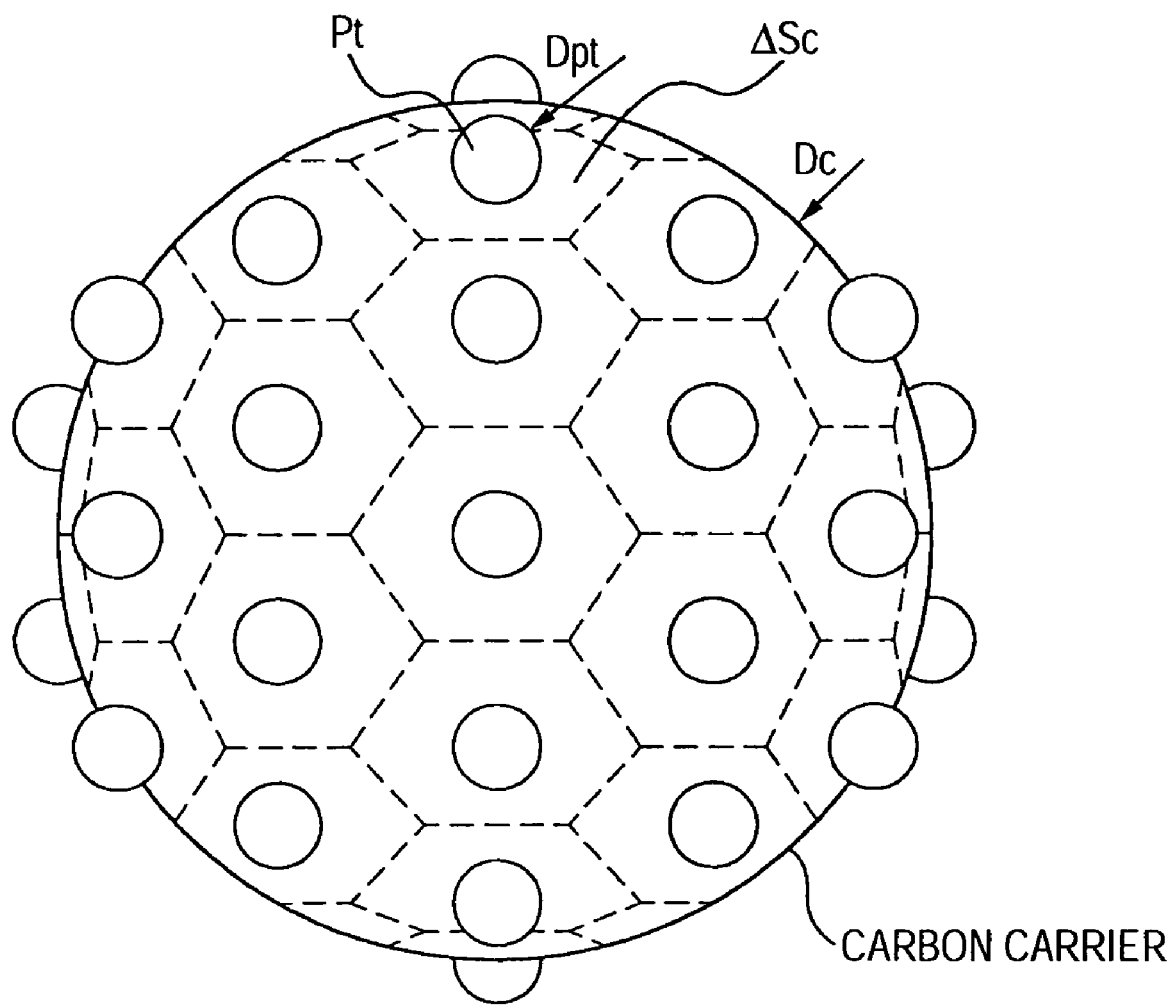
FIG. 2 is a diagram illustrating diagrammatically a relation between the Pt carrying carbon, the Pt and the carbon carrier.
Figure 3A:
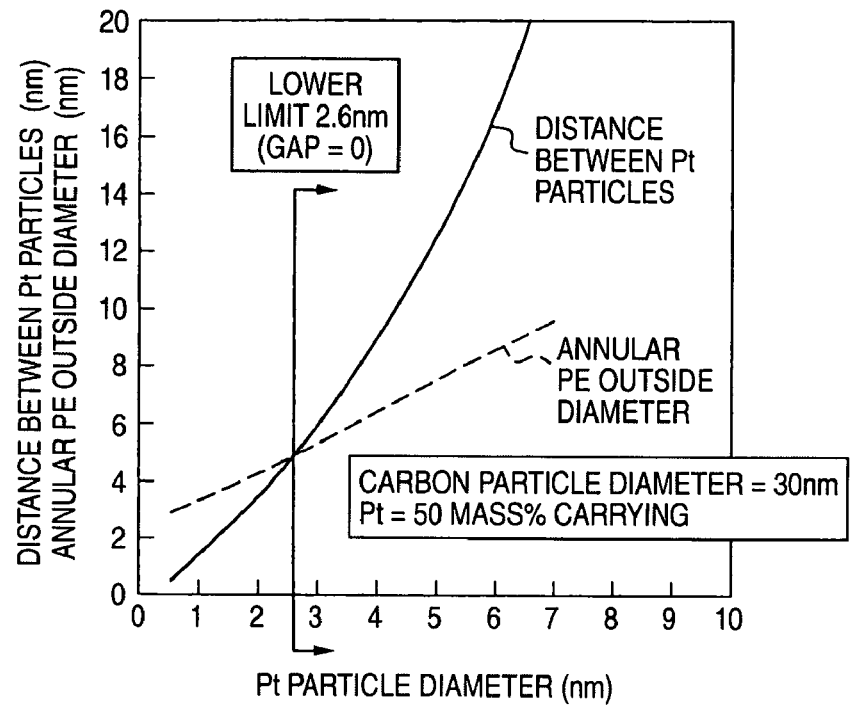
FIG. 3A is a graph illustrating a relation between the Pt particle diameter which is shown along the axis of abscissa and the distance between the Pt particles and an annular solid polymer outside diameter which are shown along the axis of ordinate.
Figure 3B:
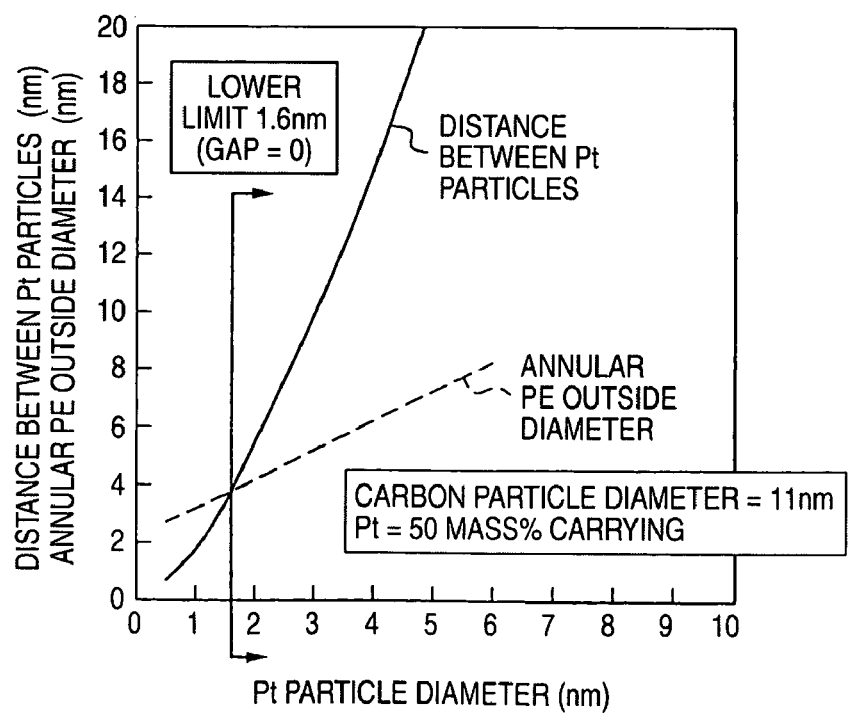
FIG. 3B is a graph illustrating a similar relation in a different condition from that of FIG. 3A.

FIG. 2 is a diagram which illustrates diagrammatically a relation among the Pt carrying carbon, the Pts and the carbon carrier. FIG. 3A is a graph illustrating a relation between the Pt particle diameter (the catalyst particle diameter) which is shown along the axis of abscissa and the distance between the Pt particles and an annular solid polymer outside diameter (also referred to as an "annular PE outside diameter" from time to time) which are shown along the axis of ordinate. FIG. 3B is a graph illustrating a similar relation in a different condition from that of FIG. 3A.

In the respective equations, Dpt denotes the Pt particle diameter (nm), Dpem denotes the diameter (nm) of the main chain of the solid polymer electrolyte, Lpes denotes the length of the side chain of the solid polymer electrolyte, Dc denotes the diameter (nm) of the carbon carrier, σpt denotes the density (g/cm³) of the Pt, σc denotes the density (g/cm³) of the carbon carrier, WRpt denotes a Pt weight ratio (having no unit) of the Pt carrying carbon and Npt denotes the number of Pt particles (having no unit) per carbon carrier.

In addition, ΔSc denotes a carbon surface area per Pt particle. Additionally, Npt denotes the number of Pt particles. The distance Lpt–pt between Pt particles is such as to be provided on the assumption that the surface of the Pt is constituted by polygons.

Note that the Pt weight ratio of the Pt carrying carbon and the number of Pt particles Npt per carbon carrier are expressed by the following equation.

$$WRpt=Wpt/(Wc+Wpt) \quad (25)$$

Where, Wpt denotes a Pt weight (g) and Wc denotes the weight (g) of the carbon carrier.

$$Npt=\sigma c \cdot Dc^3/\sigma pt \cdot Dpt^3(WRpt/(1-WRpt)) \quad (26)$$

FIGS. 3A, 3B illustrate the relations of the distance (Lpt–pt) between Pt particles and the annular PE outside diameters and the Pt particle diameter Dpt, respectively, in the event that the Pt particle diameter Dpt is changed on the equations (21) to (24).

In addition, in the case of FIG. 3A, the diameter Dc of the carbon carrier is 30 (nm), the diameter Dpem of the main chain is 0.6 (nm), the length Dpes of the side chain is 0.8 (nm), the density $\sigma pt$ of the Pt is 21.45 (g/cm$^3$), and the Pt weight ratio WRpt of the Pt carrying carbon is 0.5 (Pt=50 mass % carried).

In these conditions, in the event that the Pt particle diameter Dpt is increased, as is shown in the graph, both the annular PE outside diameter and the distance Lpt–pt between the Pt particles are also increased. Incidentally, in the aforesaid conditions, a Pt particle diameter Dpt=2.6 nm constitutes a lower limit, and in these conditions, the Pt particles are aligned on the carbon carrier closely (such as with two solid polymer electrolytes being interposed therebetween). In addition, as is shown in the graph, when the gap=0, the distance between the Pt particles and the annular PE outside diameter coincide in value with each other. Thus, conveniently, the number of activation sites becomes maximum at a portion where the values coincide with each other. Incidentally, in case the Pt particle diameter becomes larger than 2.6 nm, a gap will be caused between the Pt particles (catalyst particles).

In addition, in the case of FIG. 3B, the conditions remain the same as those shown in FIG. 3A except for the carbon carrier diameter which is now 11 (nm). Also in FIG. 3B, when the Pt particle diameter Dpt is increased, as is shown in the graph, both the annular PE outside diameter and the distance Lpt–pt between the Pt particles are also increased. Incidentally, in the aforesaid conditions, a Pt particle diameter Dpt=1.6 nm constitutes a lower limit, and in these conditions, the Pt particles are aligned on the carbon carrier closely (such as with two pieces of solid polymer electrolyte being interposed therebetween). In addition, as is shown in the graph, when the gap=0, the distance Lpt–pt between the Pt particles and the annular PE outside diameter coincide in value with each other. In addition, in case the Pt particle diameter becomes larger than 1.6 nm, a gap will be caused between the Pt particles (catalyst particles).

According to the second embodiment of the invention, at the electrode of the fuel cell, a path (a three phase interface) for gases (hydrogen/oxygen), ions (H$^+$) and electrons (e$^-$) can be secured, and the number of activation sites can be increased, whereby the performance of the electrode catalyst layer is improved. In addition, the equations (21) to (26) according to the second embodiment provides an optimized specification for the electrode catalyst layer, whereby the reactivity can be made better so as to improve the power generating performance or so as to maintain or improve the power generating performance even if the amount of platinum (the amount of Pt) is reduced (namely, the amount of Pt can be attempted to be optimized)

(Third Embodiment)

Next, referring to the accompanying drawings, a solid polymer electrolyte membrane fuel cell electrode catalyst layer according to a third aspect of the invention will be described in detail below.

According to the third embodiment of the invention, there is provided a solid polymer electrolyte membrane fuel cell electrode catalyst layer as set forth in the first or second embodiment of the invention, wherein the amount of the solid polymer electrolyte is such as to cover the Pt particle substantially entirely.

Figure 4:
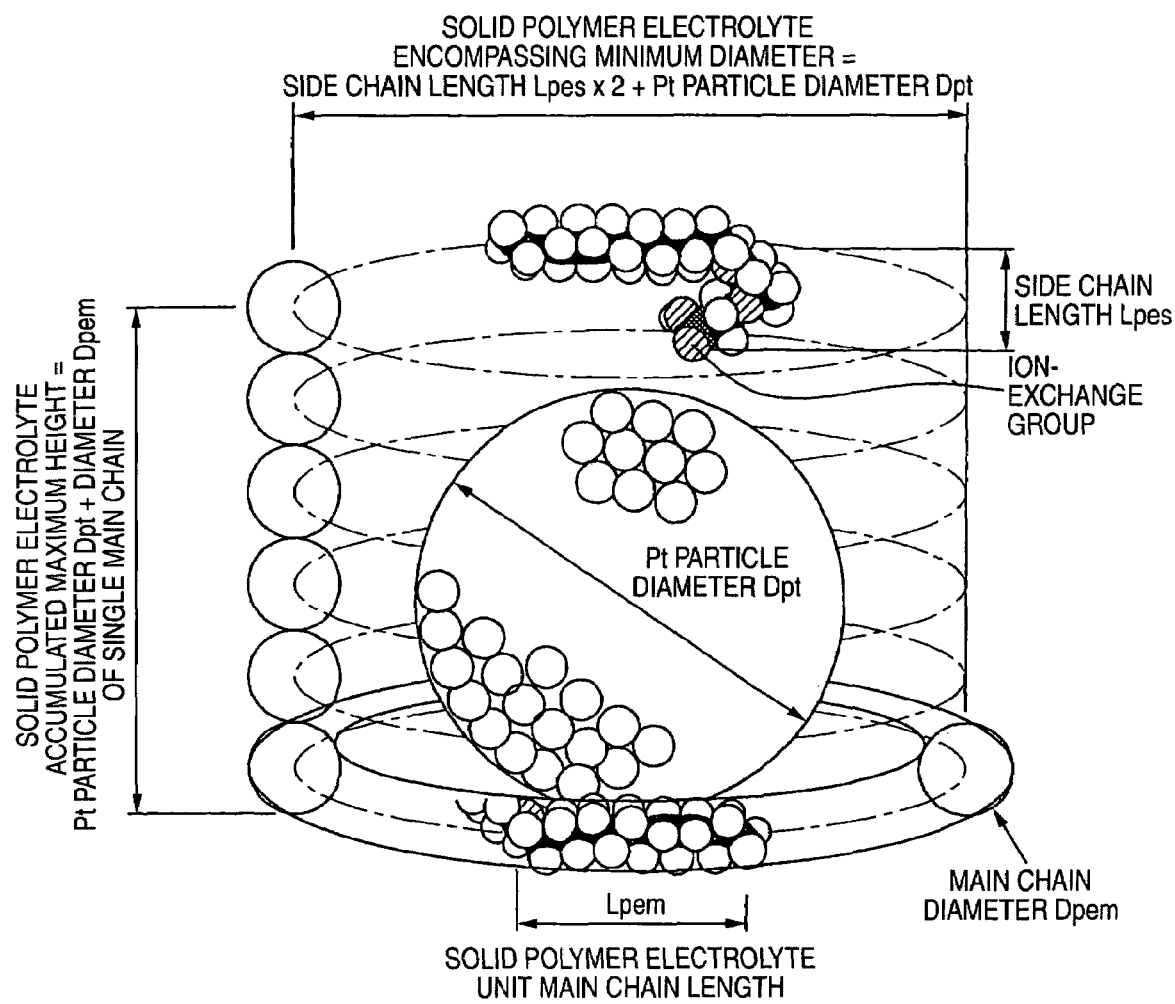
FIG. 4 is a diagram illustrating diagrammatically a relation between an accumulated solid polymer electrolyte maximum height and a solid polymer electrolyte encompassing maximum diameter.
Figure 5A:
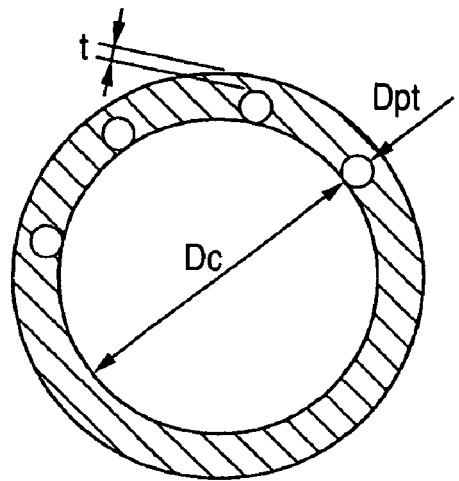
FIG. 5A is a diagram illustrating diagrammatically a relation among a carbon carrier diameter, a Pt particle diameter, and the thickness of a solid polymer electrolyte film which covers over Pt particles.
Figure 5B:
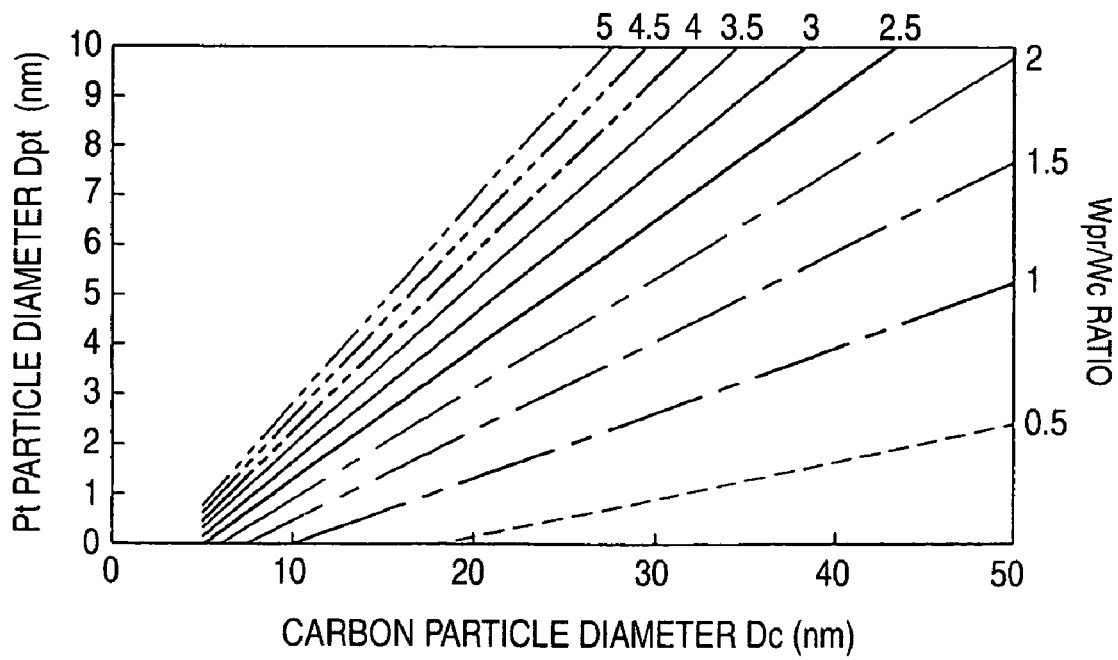
FIG. 5B is a graph showing a relation between a carbon particle diameter and the Pt particle diameter (the diameter of the Pt particle)
Figure 6:
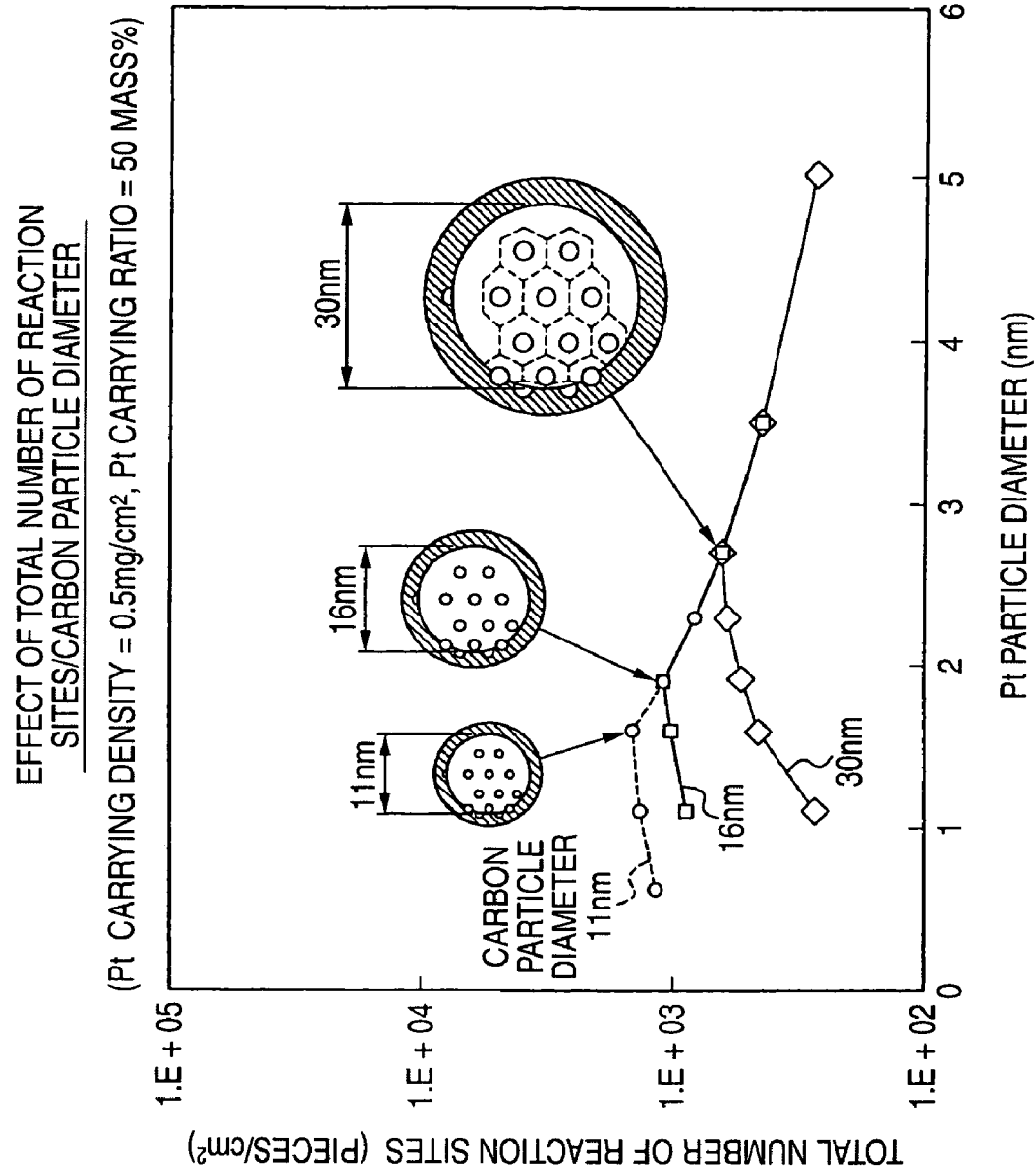
FIG. 6 is a graph illustrating a relation between the Pt particle diameter and a total number $Nt^+$ of reaction sites per unit area.
Figure 8A:
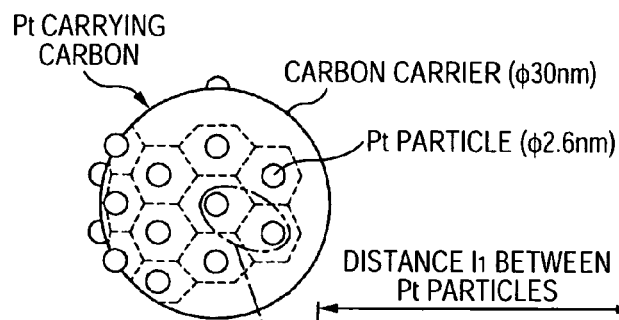
FIG. 8A is a diagram illustrating a modeled carbon on which Pt is carried.
Figure 8B:
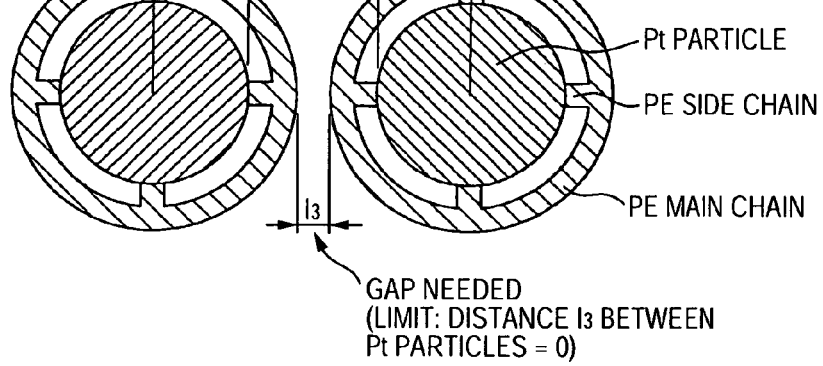
FIG. 8B is a diagram illustrating a relation between a distance between the Pt particles and a polymer electrolyte.
Figure 8C:
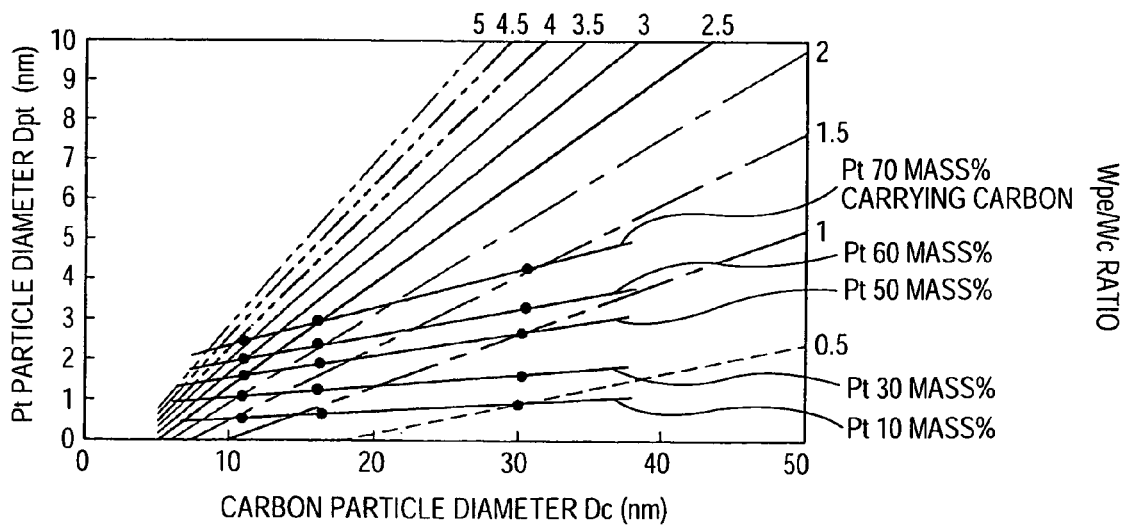
FIG. 8C is a graph illustrating a relation between the carbon particle diameter and the Pt particle diameter.

In the drawings to be referred to, FIG. 4 is a diagram illustrating diagrammatically a relation between an accumulated solid polymer electrolyte maximum height and a solid polymer electrolyte encompassing maximum diameter. FIG. 5A is a diagram illustrating diagrammatically a relation among a carbon carrier diameter, a Pt particle diameter, and the thickness of a solid polymer electrolyte film which covers over Pt particles, and FIG. 5B is a graph showing a relation between a carbon particle diameter (Dc) and the Pt particle diameter (Dpt). FIG. 6 is a graph illustrating a relation between the Pt particle diameter (Dpt) and a total number Npt$^+$ of reaction sites per unit area. FIG. 7 is a graph illustrating a relation between a Pt carrying ratio and the total number Npt$^+$ of reaction sites per unit area. FIG. 8A is a diagram illustrating a modeled carbon on which Pt is carried, FIG. 8B is a diagram illustrating a relation between a distance between the Pt particles and a polymer electrolyte, and FIG. 8C is a graph illustrating a relation between the carbon particle diameter (Dc) and the Pt particle diameter (Dpt).

The third embodiment is such as to be made based on the following knowledge and findings. Namely, since the number of reaction sites where catalyst reactions are generated can be maximized in a condition where a maximum number of ion-exchange groups which are provided on the side chains of a solid polymer electrolyte exist in close contact with the surface of the Pt particle, that is an optimal condition. In addition, an amount in which at least one main chain of the solid polymer electrolyte is accumulated on the Pt particle diameter is an amount which covers the Pt particle substantially entirely. An amount in which approximately two main chains are accumulated is preferable, since a Pt having a larger particle diameter can be covered which is produced due to a variation in production.

The number of reaction sites per Pt particle can be calculated by the following equation (31). Here, what is calculated here is the number of reaction sites on the assumption that solid polymer electrolyte main chains are disposed annularly around an outer circumference of the Pt particle at intervals which each correspond to the length of the side chain, the structure of the annularly disposed electrolyte main chains being accumulated closely to one another as shown in FIG. 4. Note that while the single Pt particle cannot be encompassed by a total of the lengths of the polymers in reality, the aforesaid modeling was made for the convenience of calculating the number of reaction sites.

$$Npe^+=\pi(Dpt+2\ Lpes)\ ((Dpt/Dpem)+1)/Lpem \quad (31)$$

where, Dpt denotes the diameter (nm) of the Pt, Lpes denotes the length (nm) of the side chain of the solid polymer electrolyte, Dpem denotes the diameter (nm) of the main chain of the solid polymer electrolyte, and Lpem denotes the repeating unit length (nm) of the main chain.

Note that the accumulated solid polymer electrolyte maximum height corresponds to a sum of the Pt particle diameter Dpt and the diameter Dpem of a single main chain, as shown in FIG. 4. In addition, the solid polymer electrolyte encompassing minimum diameter corresponds to the length Lpes of the side chain×2+Pt particle diameter Dpt.

A calculation example of the amount of electrolyte which can cover the overall surface of the Pt particle will be described by reference an equation (32) and FIG. 5.

$$Wpe/Wc=\sigma pe(\pi(Dc+2t)^3/6-(\pi \cdot Dc^3/6))/\sigma c(\pi \cdot Dc^3/6) \quad (32)$$

where, Dc denotes the diameter (nm) of the carbon carrier, t denotes the thickness of a film of solid polymer electrolyte which covers over the Pt particle, Wpe/Wc denotes an electrolyte/carbon unit mass weight ratio (having no unit), σpe denotes the density (g/cm$^3$) of the electrolyte, and σc denotes the density (g/cm$^3$) of the carbon carrier. Note that the thickness of the film of solid polymer electrolyte which covers over the Pt particle (also referred to as a "film thickness" from time to time) t is illustrated diagrammatically in FIG. 5A.

FIG. 5B is a graph illustrating a relation among the carbon particle diameter Dc, the Pt particle diameter Dpt and the electrolyte/carbon unit weight ratio Wpe/Wc when the film thickness t is made constant at 1.3 nm (in other words, the Pt particle is covered 1.3 nm thick with the solid polymer electrolyte).

It is understood from the graph that with the carbon particle diameter Dc being kept the same, in the event that the diameter Dpt of the Pt carried is increased, the amount Wpe of required solid polymer electrolyte needs to be increased. In addition, it is also understood that with the Pt particle diameter Dpt being kept the same, in the event that the carbon particle diameter Dc is decreased, the amount of required solid polymer electrolyte also needs to be increased.

The number of reaction sites Nt$^+$ that are contained per electrode unit area on a solid polymer electrolyte membrane fuel cell electrode catalyst layer can be expressed by the following equation (33) or equation (34).

$$Nt^+=Npe^+ \times Ntpt \quad (33)$$

$$=[\pi(Dpt+2Lpes)\{(Dpt/Dpem)+1\}]/Lpem \times Ntpt \quad (34)$$

In the equation (34), Dpt denotes the Pt diameter (nm), Lpes denotes the length (nm) of the side chain of the solid polymer electrolyte, Dpem denotes the diameter (nm) of the main chain of the solid polymer electrolyte, and Lpem denotes a repeating unit length (nm) of the solid polymer electrolyte. In addition, Npe$^+$ dentes a maximum number of ion-exchange groups per Pt particle that can contact the Pt particle surface, and Ntpt denotes a total number of Pts that are contained per electrode unit area.

In addition, in the event that the Pt particle is made up of a single element, the total number of Pt particles that are contained per electrode unit area can be expressed by the following equation (35).

$$Ntpt=Wtpt/(\pi \sigma pt Dpt^3/6) \quad (35)$$

In the equation (35), σpt denotes the density of the Pt particle, and Wtpt denotes the amount of Pt that is used per electrode unit area.

In addition, in the event that the dimension between Pt particles is insufficient, namely in the event that adjacent Pt particles are so close to each other that main chains of two polymer electrolytes cannot be interposed therebetween, the number of reaction sites contained per electrode unit area can be obtained by a proportional subtraction by making as a reference the number of reaction sites obtained when a length is attained which allows main chains of two solid polymer electrolytes to enter between the Pt particles (when the main chains of the two solid polymer electrolytes are allowed to enter between the Pt particles: hereinafter, a term expressing a proper PE/C may also be used from time to time).

Next, a description will be made with respect to FIG. 6, which shows a graph illustrating a relation between the Pt particle diameter and the total number Nt$^+$ of reaction sites per unit area. The Pt particle diameter was made to change appropriately from 1 nm to 5 nm, and the diameter of a carbon particle was set to 11 nm, 16 nm and 30 nm, respectively.

Note that the Pt carrying density (this representing the "amount of Pt particles carried per unit surface of the carbon carrier") was set to 0.5 mg/cm$^2$, and the Pt carrying ratio was set to be constant at 50 wt %. In addition, the polymer electrolyte was such as to be expressed by the chemical equation (1) described earlier, and the polymer electrolyte of a type where x, y, m and n were selected as predetermined (hereinafter, referred to as a "type A" in this specification) was used.

From FIG. 6, with the Pt carrying ratio being made constant, in the respective carbon particle diameters of 11 nm, 16 nm and 30 nm, the total number of reaction sites Nt$^+$ showed a tendency to increase once as the Pt particle diameter decreased from 5 nm to 1 nm and to decrease gradually thereafter. Then, it is recognized that there exists a Pt particle diameter where the total number of reaction sites Nt$^+$ becomes maximum in the respective carbon particle diameters.

In addition, there is also shown therein a tendency that the Pt particle diameter where the total number Nt$^+$ of reaction sites becomes maximum decreased as the carbon particle diameter decreased, whereas the maximum number of the total number Nt$^+$ of reaction sites increased as the carbon particle diameter decreased in the respective carbon particle diameters.

This is because the number of Pt particles is considered to be able to be increased by reducing the Pt particle diameter in the event that the Pt carrying ratio is maintained constant, since the surface area per unit volume (surface area/volume) of the carbon carrier increases as the diameter of the carbon particle decreases, that is, as carbon is micronized.

However, in the event that the Pt particle diameter decreases below a predetermined value in the respective carbon diameters, since the Pt carrying ratio is maintained constant, the distance between the adjacent Pt particles becomes so narrow that the main chain of the polymer electrolyte is not allowed to enter therebetween and deviates from the proper PE/C value, whereby the total number Nt$^+$ of reaction sites decreases.

Here, for example, assuming that the polymer electrolyte is formed from perfluorosulfonic acid, in the carbon diameters of 11 nm, 16 nm and 30 nm, the Pt particle diameters where the total number Nt$^+$ of reaction sites becomes maximum are 1.6 nm, 1.9 nm and 2.6 nm, respectively. Thus, by specifying the polymer electrolyte like this, it is possible to determine a Pt particle diameter where the total number Nt$^+$ of reaction sites becomes maximum for the polymer electrolyte so specified.

Next, the third embodiment will be described by reference to FIG. 7, which shows a graph illustrating a relation between the Pt carrying ratio and the total number Nt$^+$ of reaction sites per unit area. In the embodiment illustrated in this drawing, the Pt carrying ratio was set so as to vary appropriately from 0.1 (=10 wt %) to 0.8 (=80 wt %), and the carbon particle diameter was set to 11 nm, 16 nm and 30 nm.

Note that the Pt carrying density (this representing the "amount of Pt particles carried per unit surface area of the carbon carrier") was set to 0.5 mg/cm$^2$, and the Pt particle diameter was set to be constant at 2.3 nm. In addition, the polymer electrolyte of the type A was used, and the PE (polymer electrolyte)/C (carbon) mass ratio was set to a proper value (also in graphs that will be described below, the same conditions are adopted unless otherwise stated).

From FIG. 7, assuming that the total number Nt$^+$ of reaction sites is set to be constant; there is shown a tendency that the number Nt$^+$ of reaction sites indicated constant values for the respective carbon particle diameters of 11 nm, 16 nm and 30 nm even if the Pt carrying ratio increased from 0.1 to a certain value (for example, a Pt carrying ratio of 0.45 for the carbon particle diameter of 30 nm), whereas in the event that the Pt carrying ratio increase higher than the certain value, the total number Nt$^+$ of reaction sites showed a tendency to decrease. In addition, as the carbon particle diameter increases, there is also shown there in a tendency for the certain value to decrease, that is, a tendency for the total number Nt$^+$ of reaction sites to decrease at a lower Pt carrying ratio.

This is because since the surface area per unit volume of the carbon carrier decreases as the carbon particle diameter increases, in the event that the Pt carrying ratio is increased too high, the Pt particle exceeds its most compacted condition and is then carried on the carbon carrier, whereby the main chains of the two polymer electrolytes are not allowed to enter between the Pt particles.

Next, the third embodiment will be described by reference to FIGS. 8A to 8C. FIG. 8A is a diagram illustrating a modeled carbon on which Pt particles are carried, FIG. 8B is a diagram illustrating a positional relation between any adjacent Pt particles, and FIG. 8C is a graph illustrating a relation between the carbon particle diameter (Dc) and the Pt particle diameter (Dpt).

As shown in FIG. 8A, a platinum carrying carbon is formed when a plurality of platinum particles are carried on the surface of the carbon carrier which is formed substantially into a spherical shape.

As shown in FIG. 8B, the Pt particle is formed in such a manner that the PE covers the surface of the platinum carrying carbon in a film-like fashion. Note that as a matter of convenience for description, a gap formed between adjacent Pt particles is defined as $l_1$ and the distance of the gap is defined as $l_2$.

FIG. 8C is a graph including additions made to FIG. 5B and illustrating a relation between the diameter Dc of the carbon carrier and the diameter Dpt of the Pt when the gap between the Pt particles which are each formed by covering a Pt particle with the polymer electrolyte becomes zero ($l_2$=0) (such a condition is referred to as "most compacted condition"). In addition, in FIG. 8C, the relation is illustrated for Pt carrying ratios of 10, 30, 50, 60 and 70 wt(mass) %, respectively.

Namely, it is illustrated that a most compacted condition or a condition where the gap ($l_3$) between adjacent Pt particles in FIG. 8B is zero is realized on boundaries between the respective Pt carrying ratios. Since the Pt particle diameter is large in an upper area above each boundary depicted in FIG. 8C despite of the fact that the Pt carrying ratio remains the same, it illustrates a condition where a gap is being-generated between the adjacent Pt particles. On the other hand, since the Pt particle diameter is small in a lower area below each boundary despite of the fact that the Pt carrying ratio remains the same, it means a condition where adjacent Pt particles come so closer to each other on the surface of the carbon carrier that the distance therebetween becomes shorter than a double of the sum of the radius of the main chain of the PE and the length of the side chain thereof, whereby the main chains of two PEs are not allowed to enter between the Pt particles.

It is recognized that in each Pt carrying ratio, the diameter of the Pt particle is preferably made to increase as the diameter Dc of the carbon carrier increases, whereby Pt particles can be formed which are in a most compacted condition.

In addition, it is recognized that the Pt particle diameter must be increased preferably in order to increase the Pt carrying ratio while the most compacted state is held.

Additionally, a Wpe/Wc line illustrated in the same graph indicates an optimal PE/C mass ratio adopted when a Pt particle is used which carries Pt at a predetermined carrying ratio using Pt and carbon which have predetermined particle diameters.

A most compacted condition can be realized or the gap between the adjacent Pt particles can be reduced to zero by setting, for example, the polymer electrolyte to the type A, the carbon carrier diameter to 11 nm, the diameter of Pt carried to 1.6 nm, the PE/carbon mass ratio to 2.5, and the Pt carrying ratio to 50 wt %.

(Fourth Embodiment)

According to a fourth embodiment of the invention, there is provided a solid polymer electrolyte membrane fuel cell electrode catalyst layer as set forth in any of the first to third embodiments of the invention, wherein the diameter (Dc) of the carbon carrier is 30 nm or smaller, wherein the diameter (Dpt) of the Pt particle ranges from 0.6 nm or greater to 2.0 nm or smaller, and wherein the carrying ratio of the Pt particle is 30 mass % or smaller when expressed in the Pt carrying weight ratio (WRpt) which is a ratio of the mass of the Pt particle relative to the carbon carrier.

Namely, this fourth embodiment illustrates a model in which the particle diameter of the carbon carrier, the diameter of the Pt particles carried on the carbon carrier and the main chain of the polymer electrolyte (PE) which is disposed between the individual Pt particles are formed into optimal conditions, respectively, so that a high Pt activation which is desired to be provided on the solid polymer electrolyte membrane fuel cell electrode layer according to the invention can be obtained securely and efficiently. In other words, in the fourth embodiment, the individual Pt particles are carried on the carbon carrier uniformly without being overlapped, and numerical ranges are provided for the diameter of the carbon carrier (the carbon particle diameter Dc), the Pt particle diameter (Dpt) and the Pt carrying mass ratio (WRpt), respectively, so as to embody a condition where main chains of two PEs are disposed between the Pt particles.

Figure 9:
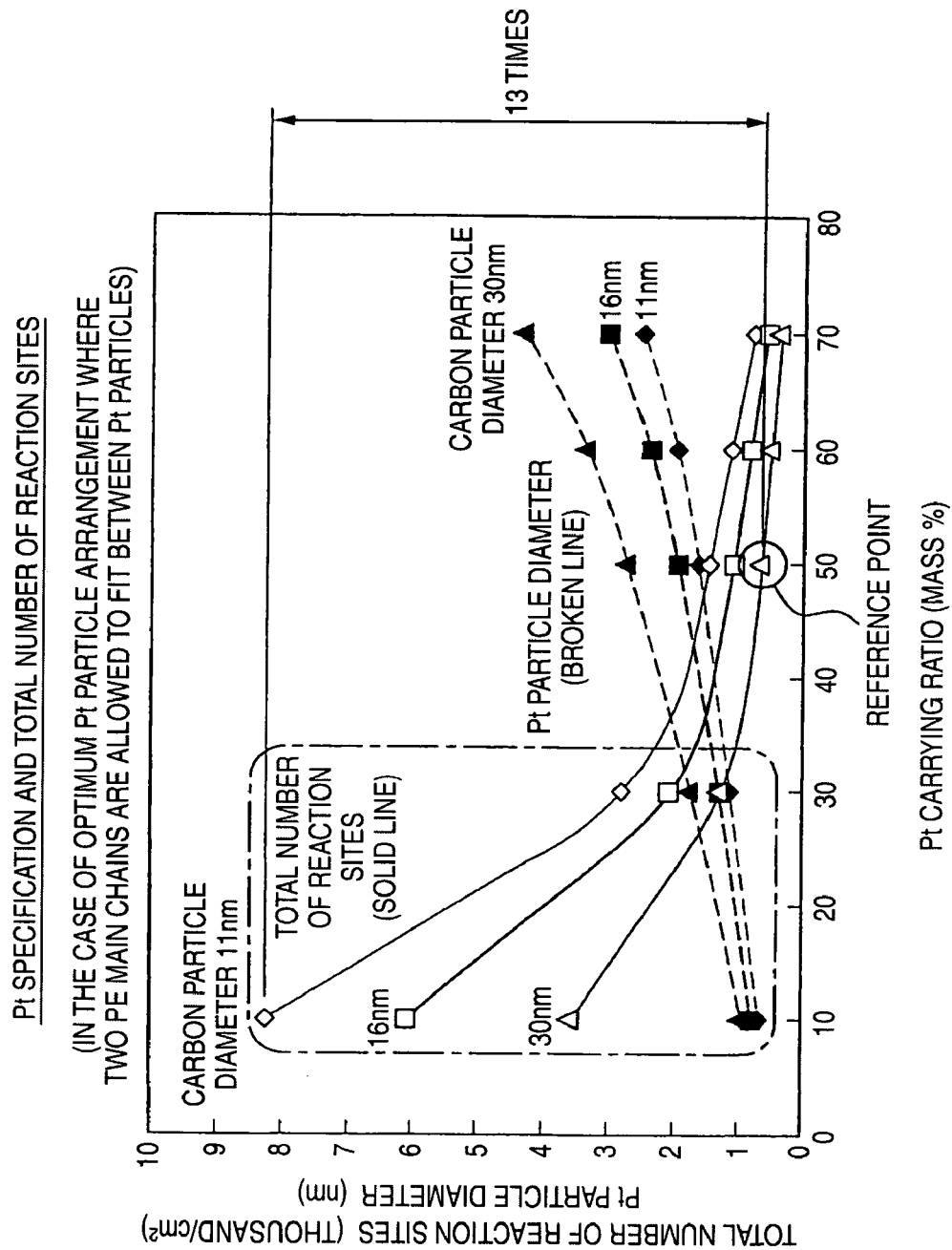
FIG. 9 is a graph illustrating a relation between the Pt carrying ratio relative to the carbon carrier and the total number of reaction sites which is the results of simulation experiments carried out on a Pt comprising Pt particles carried on a carbon carrier and a film of a polymer electrolyte which is covered over the Pt particles so carried.

The fourth embodiment of the invention will be described below based on FIGS. 9, 10. FIG. 9 is a graph illustrating a relation between the Pt carrying ratio relative to the carbon carrier and the total number of reaction sites which is the results of simulation experiments carried out on a Pt comprising Pt particles carried on a carbon carrier and a film of a polymer electrolyte which is covered over the Pt particles so carried based on the equation (33) or the equation (34) which were described earlier.

Note that here will be described below as an example a case where platinum (Pt) and the type A having the sulfonic group on the side chain were used as the Pt particles and the polymer electrolyte (PE), respectively, and calculations were made while assuming the following conditions as a matter of convenience (refer to FIG. 4).

(A) The Pt particles are carried uniformly on the carbon carrier with a distance t being provided between the Pt particles.
(B) The PE (of the type A) has a single main chain wound around an outer surface of the carbon carrier on which the Pt particles are carried (hereinafter, referred to as a "PT carrying carbon") in a cylindrical (spiral) manner.
(C) Furthermore, the PE (of the type A) has a single main chain wound around an outer surface of the Pt particle carried on the carbon carrier in a cylindrical (spiral) manner while being spaced apart from the Pt particle by a distance corresponding to the length of the side chain.
(D) A distance between the Pt particles is made to be a double of the sum of the radius of the cross section of the main chain of the PE (of the type A) and the length of the side chain of the PE.

Assuming the conditions described above, the number of reaction sites per Pt carrying carbon and the total number of reaction sites of all the Pt carrying carbons were obtained.

Here, the "reaction site" denotes those of the Pt particles carried on the carbon carrier which are in contact with the sulfonic group ($SO_3^-$) of the side chain of the PE (of the type A), and the "total number of reaction sites" denotes what is obtained by multiplying the number of reaction sites per Pt particle by the total number of Pt particles. Namely, the "reaction site" is a portion where the Pt activation is considered to be enhanced by an interaction resulting when the Pt particles are brought into contact with the sulfonic group.

Graphs illustrated in solid lines in FIG. 9 illustrate relations between the carrying ratio of Pt particles and the total number of reaction sites of Pt carrying carbons on various types of Pt carrying carbons when assuming that Pts whose particle diameters are set so as to form a most compacted condition such as shown in FIG. 8C are carried on carbon carriers having particle diameters of 11 nm, 16 nm, 30 nm, respectively, in conditions where the carrying density (meaning the "amount of Pt particles carried per unit surface of the carbon carrier") is set to be constant (at 0.5 mg/cm$^2$) and the carrying mass ratio is set to 10, 30, 50, 60, 70 mass %, respectively.

In addition, graphs illustrated in broken lines in FIG. 9 illustrate relations between the carrying ratio of Pt particles and the Pt particle diameter on various types of Pt carrying carbons when assuming that Pts are carried on carbon carriers having particle diameters of 11 nm, 16 nm, 30 nm, respectively, in conditions where the carrying density is set to be constant (at 0.5 mg/cm$^2$) and the carrying mass ratio ranges from 10 to 70 mass %.

Referring now to the graphs illustrated in solid line in FIG. 9, it is recognized that under the conditions where the Pt carrying density (0.5 mg/cm$^2$) is constant and the particle diameter is set so as to form a most compacted condition such as shown in FIG. 8C, the Pt carrying mass ratio and the total number of reaction sites have a negative correlation for any of the particle diameters of the carbon carriers (carbon particle diameters) of 11 nm, 16 nm, 30 nm, and additionally, it is recognized that in the event that the Pt carrying mass ratio remains the same, the total number of reaction sites increases as the particle diameter of the carbon carrier decreases. In particular, the ratio at which the total number of reaction sites increases became remarkable where the Pt carrying mass ratio varies between 30 to 10 mass %.

Among the graphs illustrated in solid lines in FIG. 9, assuming that the Pt, for example, in which the carbon particle diameter of the carbon carrier is 30 nm and the Pt carrying ratio is 50 mass % is made to be a reference Pt, the total number of reaction sites of the Pt in which the carbon particle diameter is 11 nm and the Pt carrying ratio is 10 mass % became about thirteen times larger than the total number of reaction sites of the reference Pt, and it can be expected to embody a Pt having a Pt activation which is remarkably higher than that of the reference Pt by configuring the Pt in that manner.

Next, referring to the graphs illustrated in broken lines in FIG. 9, it is recognized that under the condition where the Pt carrying density (0.5 mg/cm$^2$) is constant, the Pt carrying mass ratio and the Pt particle diameter have a positive correlation. It is clear from this relation that in order to increase the total number of reaction sites as high as possible with the Pt carrying mass ratio being kept the same, the particle diameter of the carbon carrier should be made smaller and the particle diameter of the Pt should also be made smaller.

Note that an area (where the Pt carrying mass ratio varies between 10 to 30 mass %) surrounded by an alternate long and short dash line in FIG. 9 illustrates a conditional range where the total number of reaction sites is relatively large and hence where a relatively high Pt activation can be embodied. The fourth embodiment of the invention provides a model in which the conditions for embodying securely and efficiently a Pt carrying carbon having a larger total number of reaction sites are determined theoretically which can produce such a higher Pt activation.

Furthermore, while the inventors implemented similar calculations to those implemented earlier by modifying the kinds of polymer electrolytes among the conditions (A) to (D) assumed earlier in obtaining the relations illustrated in FIG. 9 and altering variously the distance t between the Pt particles in accordance with the change so made to the kinds of polymer electrolytes, it became clear that tendencies similar to those illustrated in FIG. 9 were indicated in any of the cases. This indicates that the total number of reaction sites can be increased, irrespective of the kinds of polymer electrolytes, by setting the particle diameter of the carbon carrier (the carbon particle diameter Dc), the Pt particle diameter (Dpt) and the Pt carrying mass ratio (WRpt) in proper ranges, respectively.

A knowledge was obtained from the results of the calculations that in order to increase the total number of reaction sites of Pt relatively highly, the carbon particle diameter is desirably set to 30 nm or smaller. Next, based on the knowledge so obtained, the inventor et al. studied about desirable ranges for the Pt particle diameter Dpt and the Pt carrying ratio (the carrying mass ratio (WRpt)) which can serve to increase the total number of reaction sites of Pt relatively highly. The results of the studies are shown in FIG. 10.

Figure 10:
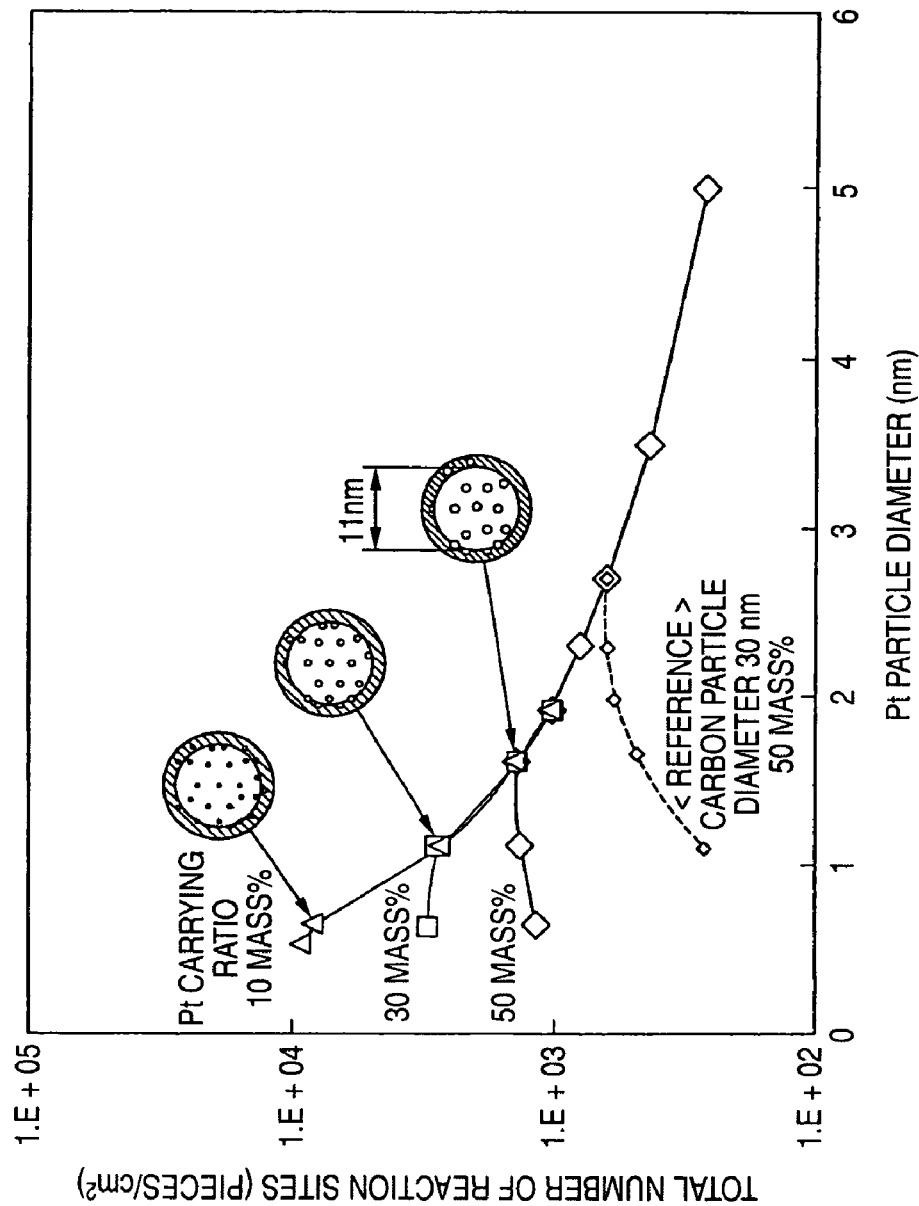
FIG. 10 is a graph illustrating a relation between the Pt particle diameter and the total number of reaction sites which was obtained through simulation experiments with the particle diameter of the carbon carrier being made to be 11 nm and the Pt carrying density being made to be constant at 0.5 mg/cm$^2$.

FIG. 10 is a graph illustrating a relation between the Pt particle diameter and the total number of reaction sites which was obtained through simulation experiments implemented based on the equation (33) or the equation (34) in the aforesaid conditions (A) to (D) with the particle diameter (Dc) of the carbon carrier being made to be 11 nm and the carrying density of Pt carried on this carbon carrier (meaning the "amount of Pt particles carried per unit area of the carbon carrier") being made to be constant at 0.5 mg/cm$^2$.

In FIG. 10, the axis of abscissa represents the Pt particle diameter of Pt particles carried on the carbon carrier, whereas the axis of ordinate represents the total number of reaction sites on the Pt carrying carbon in which PE was placed to cover the total surface of Pt particles carried on the carbon carrier. In addition, FIG. 10 illustrates a relation between the Pt particle diameter and the total number of reaction sites when the Pt carrying ratio (the carrying mass ratio (WRpt)) was set to 10 mass %, 30 mass %, and 50 mass %, respectively.

Referring to FIG. 10, it is understood that the total number of reaction sites on the Pt carrying carbon increased as the Pt particle diameter decreased when the Pt carrying ratio (the carrying mass ratio (WRpt)) was set to 10 mass %, 30 mass % and that the total number of reaction sites increased remarkably with the Pt particle diameter being 2.0 nm or smaller.

On the other hand, when the Pt carrying ratio is set to 50 mass %, while the total number of reaction sites increase as the Pt particle diameter decrease with the Pt particle diameter being 1.6 nm or larger, the total number of reaction sites on the Pt carrying carbon decrease with the Pt particle diameter being smaller than 1.6 nm.

The results illustrated in FIG. 10 becomes identical to those illustrated in FIG. 9, that is, the results illustrated in FIG. 10 coincide with the results that the Pt carrying ratio (the carrying mass ratio (WRpt)) onto the carbon carrier decreased as the Pt particle diameter decreased, and that the total number of reaction sites on the Pt carrying carbon increased as the Pt carrying ratio onto the carbon carrier decreased. Consequently, according to the invention, it is desirable to set the Pt particle diameter to 2.0 nm or smaller and the Pt carrying ratio (the carrying mass ratio (WRpt)) is set to 30 mass % or smaller when attempting to increase securely and efficiently the total number of reaction sites on the Pt carrying carbon.

Furthermore, in FIG. 10, a relation between the Pt particle diameter and the total number of reaction sites which result when the particle diameter (Dc) of the carbon carrier and the carrying ratio (the carrying mass ratio (WRpt)) are 30 nm and 50 mass %, respectively, is shown in a broken line. Thus, in a case where the Pt carrying ratio does not satisfy the condition of the invention, with the Pt particle diameter of about smaller than 2.7 nm, the total number of reaction sites of the Pt carrying carbon decreased remarkably as the Pt particle diameter decreases, and therefore, it is not possible to enhance the activation of Pt.

From the above result, according to the invention, in order to embody a desired Pt specification by increasing the total number of reaction sites of the Pt particles as high as possible, it is desirable to set such that the particle diameter (Dc) of the carbon carrier is 30 nm or smaller, the Pt particle diameter Dpt is 2.0 nm or smaller and the Pt particle carrying ratio is 30 mass % or smaller when converted into carrying mass ratio which is a ratio of mass relative to the carbon carrier.

Note that while it is considered that with the Pt particle diameter Dpt being 2.0 nm or smaller, the smaller the Pt particle diameter becomes, the higher the advantage of the invention can be increased, in such particle diameters, since the number of atoms constituting a Pt particle is too small and it becomes difficult to hold the stability of the particulate shape, it is desirable that the Pt particle diameter Dpt is 0.6 nm or larger on actual machines. Consequently, it is desirable that Pt particle diameter Dpt ranges from 0.6 to 2.0 nm in the invention.

In addition, the solid polymer electrolyte contained in the solid polymer electrolyte membrane fuel cell electrode catalyst layer according to the invention needs to wrap closely around the outer surface of the Pt particle while being spaced away therefrom by a distance corresponding to the length of the side chain that the solid polymer electrolyte has so as to completely cover the outer surfaces of the individual Pt particles carried on the carbon carrier and moreover to hold the number of the Pt particles carried on the surface of the carbon carrier by properly holding the distance between the Pt particles. To make this happen, in this invention, the solid polymer electrolyte needs to have a straight main chain which extends linearly and has an outside diameter having a suitably small molecular structure.

A perfluorosulfonic acid polymer such as expressed by the chemical formula (1) is raised as a solid polymer electrolyte which can balance the aforesaid desired conditions according to the invention and costs in a better way. In the perfluorosulfonic acid solid polymer electrolyte expressed by the chemical formula (1), since the length thereof becomes shortest when m=1, n=1, in the event that such a solid polymer electrolyte is used, a greater number of sulfonic acid groups which are ion-exchange groups can be disposed on the outer surface of the Pt particles carried on the carbon carrier, whereby the number of reaction site on the Pt carrying carbon can preferably be increased further.

In addition, in the invention, the shorter both or either of the unit length of the main chain and the length of the side chain of the solid polymer electrolyte becomes, the higher the advantages that have been described above can be enhanced when the invention is embodied. Due to this, in the invention, as conditions desired from the viewpoint of practical use, it is desirable to satisfy both or either of the following conditions that the length of the side chain of the solid polymer electrolyte is 1 nm or smaller and that the unit length of the main chain thereof is 3 nm or smaller.

(Fifth Embodiment)

According to a fifth embodiment of the invention, there is provided a solid polymer electrolyte membrane fuel cell electrode catalyst layer as set forth in any of the first to fourth embodiments, wherein a ratio of the total number of the ion-exchange groups in the solid polymer electrolyte which contact the catalyst particles relative to the total volume of the catalyst carrier is made to become maximum.

Namely, the fifth embodiment provides an optimized model of a solid polymer electrolyte membrane fuel cell electrode catalyst layer in the electrode catalyst layers of the invention which is premised by a fact that reaction is determined by an impact probability.

The fifth embodiment will be described below based on FIG. 11.

Figure 11:
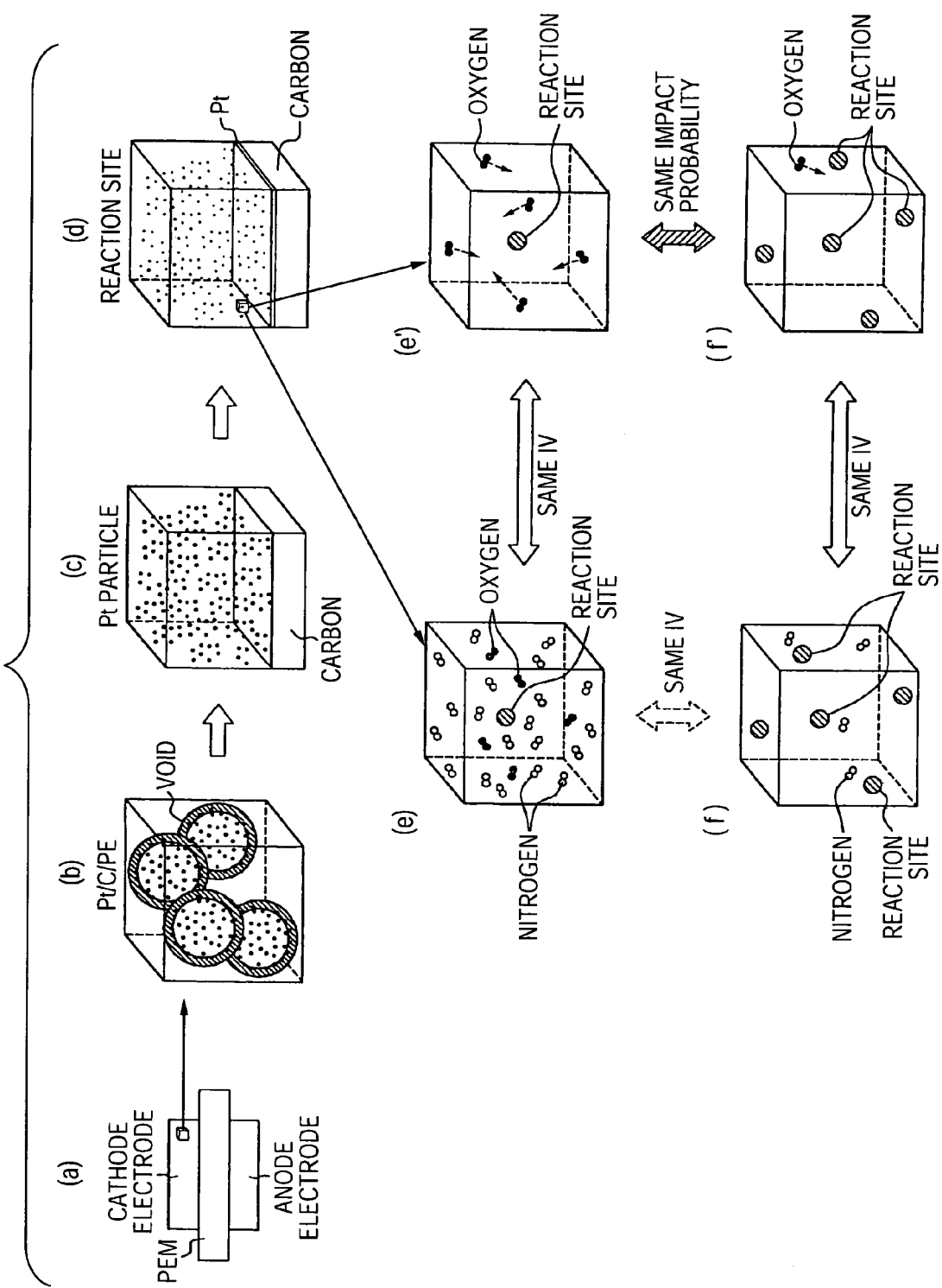
FIG. 11 is a concept diagrams illustrating a model in which reaction sites of the invention and oxygen collide.
Figure 12:
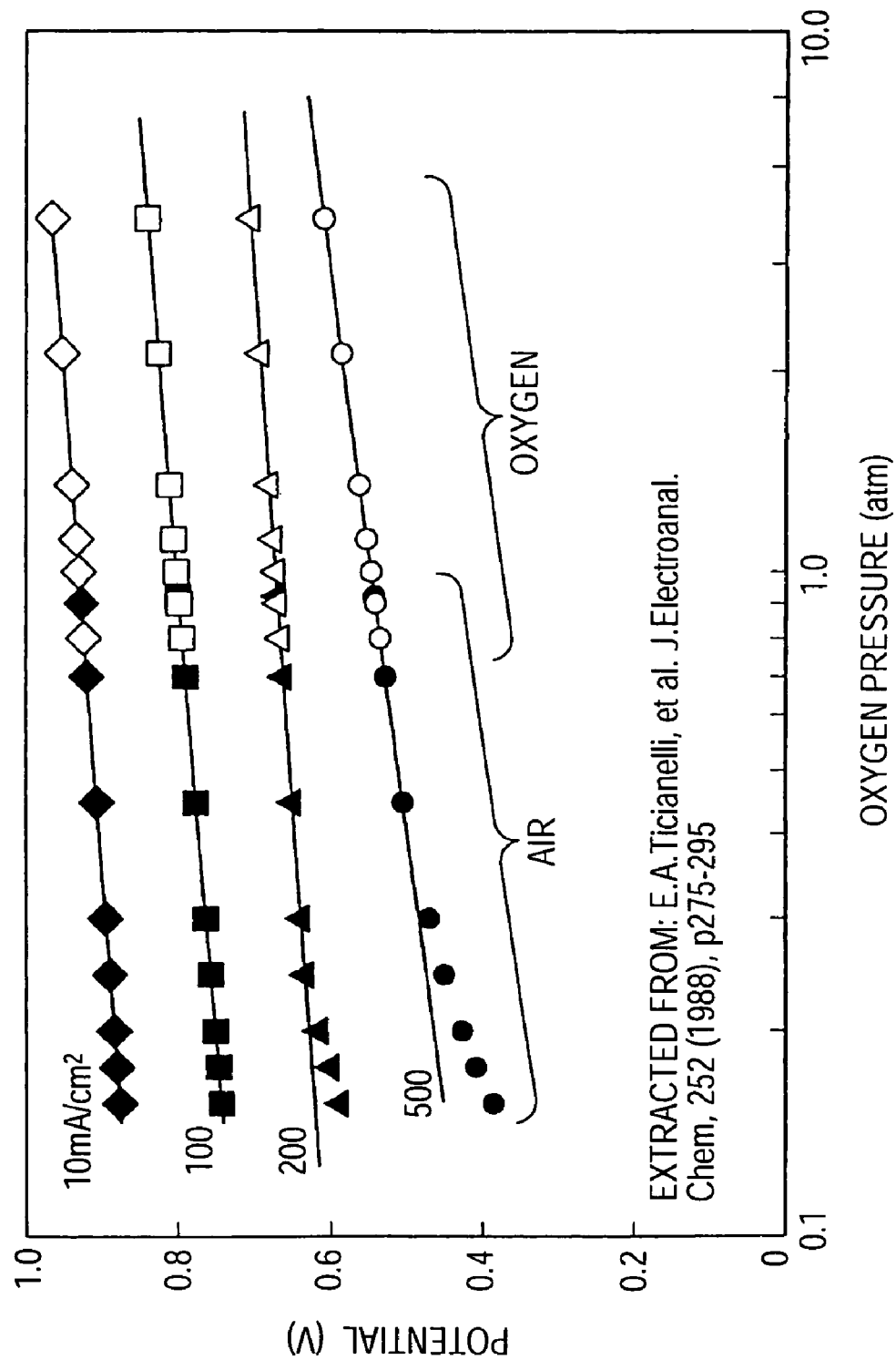
FIG. 12 is a graph illustrating a relation between the partial pressure (a t m) of oxygen and a cell potential (V)

FIG. 11 shows concept diagrams illustrating a model in which reaction sites of the invention and oxygen collide, and FIG. 12 is a graph illustrating a relation between the partial pressure (a t m) of oxygen and a cell potential (V) (extracted from: E. A Ticianeili et al. J. Electroanal Chem., 252 (1998), pp275 to 295, FIG. 7).

As shown in (a) of FIG. 11, an electrode catalyst layer of the invention which includes a catalyst Pt/C made up of carbon (C) which is a carrier and platinum Pt particles which are carried on the carbon carrier and a solid polymer electrolyte PE having at predetermined intervals ion-exchange groups which are a functional group is constructed so as to closely adhere to a solid polymer membrane PEM in a solid polymer electrolyte membrane fuel cell.

When cutting out a predetermined space of the electrode catalyst layer Pt/C/PE of the invention as show in (a) of FIG. 11, the electrode catalyst layer of the invention has, as shown in (b) of FIG. 11, a construction in which Pt/C/PE particles are compacted in the predetermined space, and there exist between the Pt/C/PE particles voids where air flows.

When comparing the sizes of molecules of gases (air or oxygen) which pass through the electrode catalyst layer, since the size of the solid polymer electrolyte PE can be ignored, as shown in (c) of FIG. 11, space arrangement models of the electrode catalyst layer (Pt/C/PE particles) of the invention can be considered separately for the Pt particle which is the catalyst and carbon which is the carrier.

When substituting a space arrangement model illustrated using reaction sites or contact portions where Pt particles contact ion-exchange groups which are the functional group in the solid polymer electrolyte PE for a space arrangement model shown in (c) of FIG. 11 based on the same consideration as that described with respect to the third embodiment, a space arrangement model of reaction sites of the electrode catalyst layer according to the invention can be represented by (d) of FIG. 11.

In the space arrangement model of reaction sites such as shown in (d) of FIG. 11, by employing space models which have the same reaction sites within the same space which is predetermined, a case where pure oxygen is caused to pass through the electrode catalyst layer according to the invention ((e') of FIG. 11) and a case where air (oxygen: 21 mol %) is caused to pass through the electrode catalyst layer according to the invention ((e) of FIG. 11) are compared.

Space models shown in (e) and (e') of FIG. 11 are spaces having the same volume which have reaction sites of a minimum unit in the space model shown in (d) of FIG. 11.

In a case where oxygen having the same partial pressure is supplied to a cathode electrode shown in (a) of FIG. 11, in the event that for example, pure oxygen gas 100 kPa and air 476 kPa (oxygen partial pressure=100 kPa) exist, the electrode potentials become the same as shown in FIG. 12.

While FIG. 12 illustrates that when the oxygen partial pressure decreases, the voltage decreases, a method will be described below for optimizing the structure of an electrode catalyst layer which can maintain the original high voltage even if the oxygen partial pressure decreases.

In this case, the same number of oxygen molecules exist in the space models shown in (e) and (e') of FIG. 11 (for the sake of easy understanding, it is assumed in (e) and (e') of FIG. 11 that the number of oxygen molecules is five).

In the electrode catalyst layer, it is considered that as the impact probability of oxygen molecules which are an reaction gas and the reaction site increases higher, the reaction proceeds more easily, whereas a loss associated with a reaction decreases. Consequently, in order to embody at a low gas pressure the same effect as that obtained at a high gas pressure under which a high voltage can be obtained, it is considered that the number of reaction sites existing in the same space only has to be increased.

This is because when two kinds of gases react with each other, the impact probability is in proportion to a product resulting when the numbers of molecules per unit volume of the respective gases are multiplied by each other. The inventor et al. applied this to the electrode catalyst layer and considered that the impact probability that oxygen molecules collide against the reaction site is in proportion to a product resulting when the number of oxygen molecules existing within the space is multiplied by the number of reaction sites.

When considering the case where pure oxygen gas is fed to the electrode, in (e') of FIG. 11, five oxygen molecules and one reaction site exist in the space, and therefore, the product of the oxygen molecules and the reaction site becomes five. (f') of FIG. 11 shows the same for an improved electrode catalyst layer n which the number of reaction sites is increased, and in there, while the oxygen partial pressure decreases to one fifth, there exists one oxygen molecule, and the number of reaction sites is increased to five, which is five times more, the product of the oxygen molecule and the reaction site thereby becoming five, which is identical to that resulting in (e') of FIG. 11. Even with respect to a more practical case where air is fed to the electrode, as with (f') and (e') of FIG. 11, the product of oxygen molecule and reaction site also becomes five in (f) and (e) of FIG. 11.

Namely, as shown in (f) of FIG. 11, even if the oxygen partial pressure in the air decreases, since in the event that the number of reaction sites per unit area in the electrode is increased appropriately, the impact probability of the oxygen molecule against the reaction sites so increased can be maintained constant, even when air is supplied to generate electric power, it is possible to obtain the same high voltage that can be obtained when pure oxygen is supplied under a high pressure.

Thus, the catalyst reaction can be induced more efficiently by increasing the "number of reaction sites per unit space" by increasing the ratio of the total number of ion-exchange groups in the polymer electrolyte which are in contact with the outer circumference of the Pt particles.

Thus, while the contribution of the reaction sites to the catalyst reaction in the electrode catalyst layer has been described by paying attention only to the spaces constituting the electrode catalyst layer, the Pt particles and the carbon carrier are contained in the predetermined volume, as shown in (d) of FIG. 11. However, the size of the Pt particle is extremely smaller than that of the carbon carrier, and hence the ratio of the volume of the Pt particles which occupies a space in the predetermined volume can be ignored substantially. Then, in order to enhance the catalyst reaction efficiency at the electrode catalyst layer, the optimization of a ratio of the space for supplying a reaction gas for the catalyst reaction and the space for discharging water produced as a result of the catalyst reaction needs to added to the optimization of the number of reaction sites at the electrode catalyst layer.

Consequently, when the space ratio is so optimized, it is possible to assume the performance of the solid polymer electrolyte membrane fuel cell electrode catalyst layer from the magnitude of the number of reaction sites relative to the predetermined volume of the carbon carrier.

Here, the "number of reaction sites per unit carbon carrier volume" is used in place of the "number of reaction sites per unit space" as an index for optimizing the catalyst reaction. Then, this "number of reaction sites per unit carbon carrier volume" is herein referred to as "reaction site number volume density" and is defined as "reaction site number volume density=$Nt^+/Vtc$". The number of reaction sites included per electrode unit area can be calculated by the following formula.

[Formula 1]

$$Nt^+ = Npe^+ \times Ntpt = \pi(Dpt+2Lpes)\{(Dpt/Dpem)+1\}/Lpem \times Ntpt \quad (51)$$

In the equation (51), $Nt^+$ denotes the total number of reaction sites, $Npe^+$ denotes the number of reaction sites per Pt particle, $Ntpt$ denotes the total number of Pt particles contained per unit area of the solid polymer electrolyte membrane fuel cell electrode, $Dpt$ denotes the diameter of the Pt particle, $Lpes$ denotes the length of the side chain of the solid polymer electrolyte PE, $Dpem$ denotes the main chain of the PE and the outside diameter of a cross section which intersects at right angles with the longitudinal direction, and Lpem denotes the length of the repeating unit of the PE.

In addition, in the event that the catalyst particle (the Pt particle) is made up of a single element, the total number Ntpt of Pt particles that are contained per electrode unit area can be expressed by the following equation.

$$Ntpt = Wtpt/\pi\sigma pt Dpt^3/6 \quad (52)$$

In the equation (52), σpt denotes the density of the Pt (g/cm$^3$: in the case of Pt, 21.45 g/cm$^3$) and Wtpt denotes the amount (g/cm$^3$: for example, 0.5 mg/cm$^3$) Pt that is used per electrode unit area.

Furthermore, the number of reaction sites when the dimension between Pt particles is insufficient can be obtained through a proportional subtraction using as a reference a dimension which allows two pieces of solid polymer electrolyte to just fit therein.

The total volume of the carrying carbon that is contained per electrode unit area can be calculated using the following equation.

$$Vtc = Ntc \times \pi Dc^3/6 \quad (53)$$

In the equation (53), Ntc denotes the total number of carrying carbon particles contained per electrode unit area, and Dc denotes the diameter (nm) of the carrying carbon.

In addition, in the event that the catalyst is a Pt which is constituted by a single element, Vtc can also be calculated by the following equation.

$$Vtc = 1/\sigma c[1 - Wpt/(Wc+Wpt)] \cdot Wtpt(Wc+Wpt)/Wpt \quad (54)$$

In the equation (54), Wpt/(Wc+Wpt) denotes the Pt carrying mass ratio (having no unit), σc denotes the density (g/cm$^3$) of the carrying carbon, and Wtpt denotes the amount of Pt used (g/cm$^3$).

Next, a specific example of the fifth embodiment according to the invention will be described based on FIGS. 13 and 14.

Figure 13:
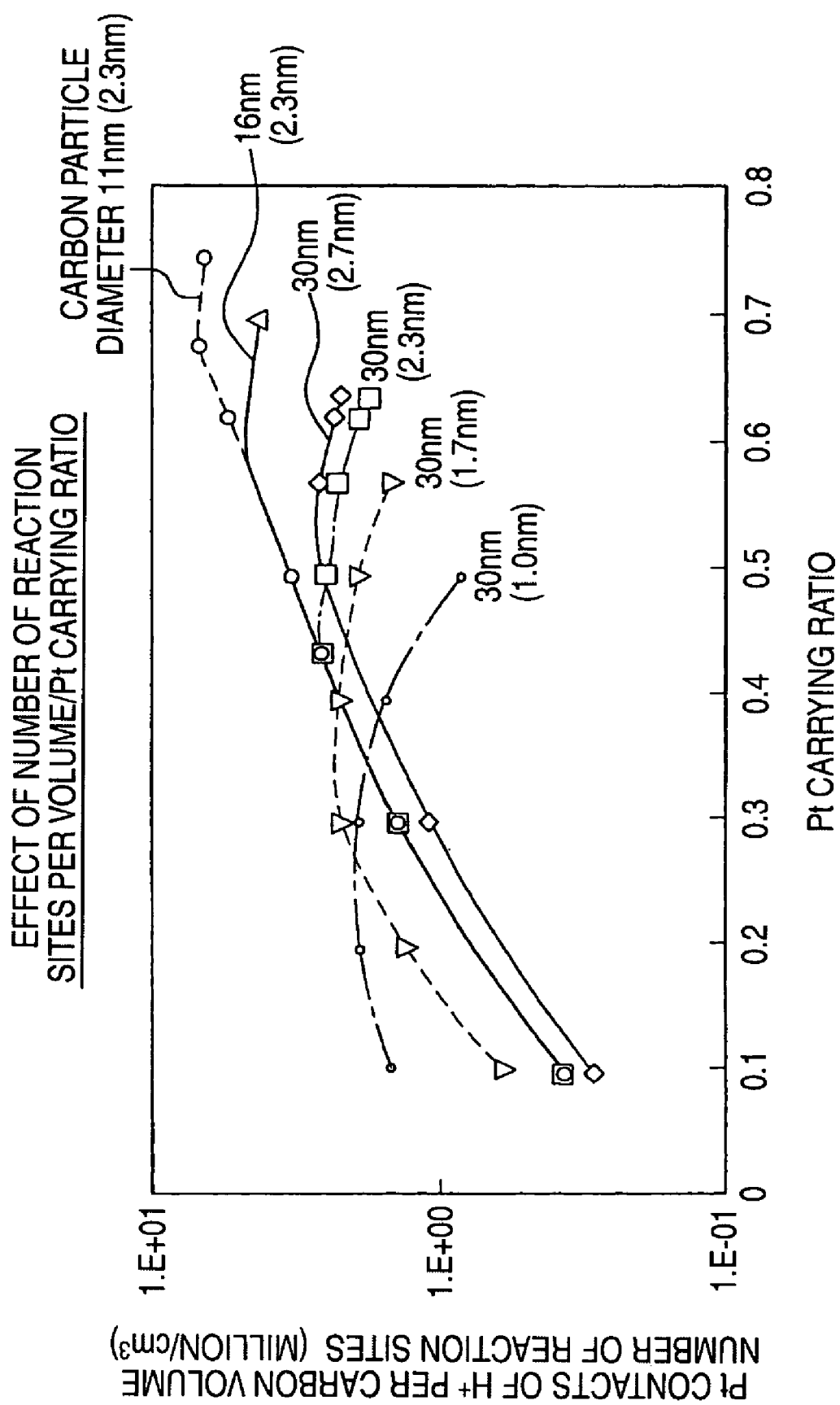
FIG. 13 is a graph illustrating a relation between the number of contacts of ion-exchange groups (reaction sites) per unit carbon carrier volume and the Pt carrying ratio.

FIG. 13 is a graph illustrating a relation between the number of contacts of ion-exchange groups (reaction sites) per unit carbon carrier volume, that is, the volume density of the reaction site and the Pt carrying ratio.

The solid polymer electrolyte PE used in FIG. 13 is a perfluorosulfonic acid polymer electrolyte of type A, and the relation between the volume density of the reaction site and the platinum carrying ratio when platinum of various particle diameters functioning as Pt particles are carried on carbon of various particle diameters is shown.

In FIG. 13, an upper numerical value such as 11 nm denotes the particle diameter of carbon and a lower parenthesized numerical value denotes the particle diameter of platinum.

In the event that a calculation is made using the equation (33), as shown in FIG. 7, with the Pt particle diameter remaining the same, the total number of reaction sites remains the same even if the Pt carrying ratio is changed. However, it is recognized that the number of reaction sites per unit carbon carrier volume shown in FIG. 13, that is, the reaction site volume density decreases as the Pt carrying ratio decreases. In addition, it is also recognized from FIG. 13 that with smaller carbon particle diameters, the reaction site volume density increases at higher carrying ratios.

Furthermore, it is also recognized from the fact that each curve has a maximum value that an optimum carrying ratio of Pt can be determined when the carbon particle diameter and the Pt particle diameter are determined.

Figure 14:
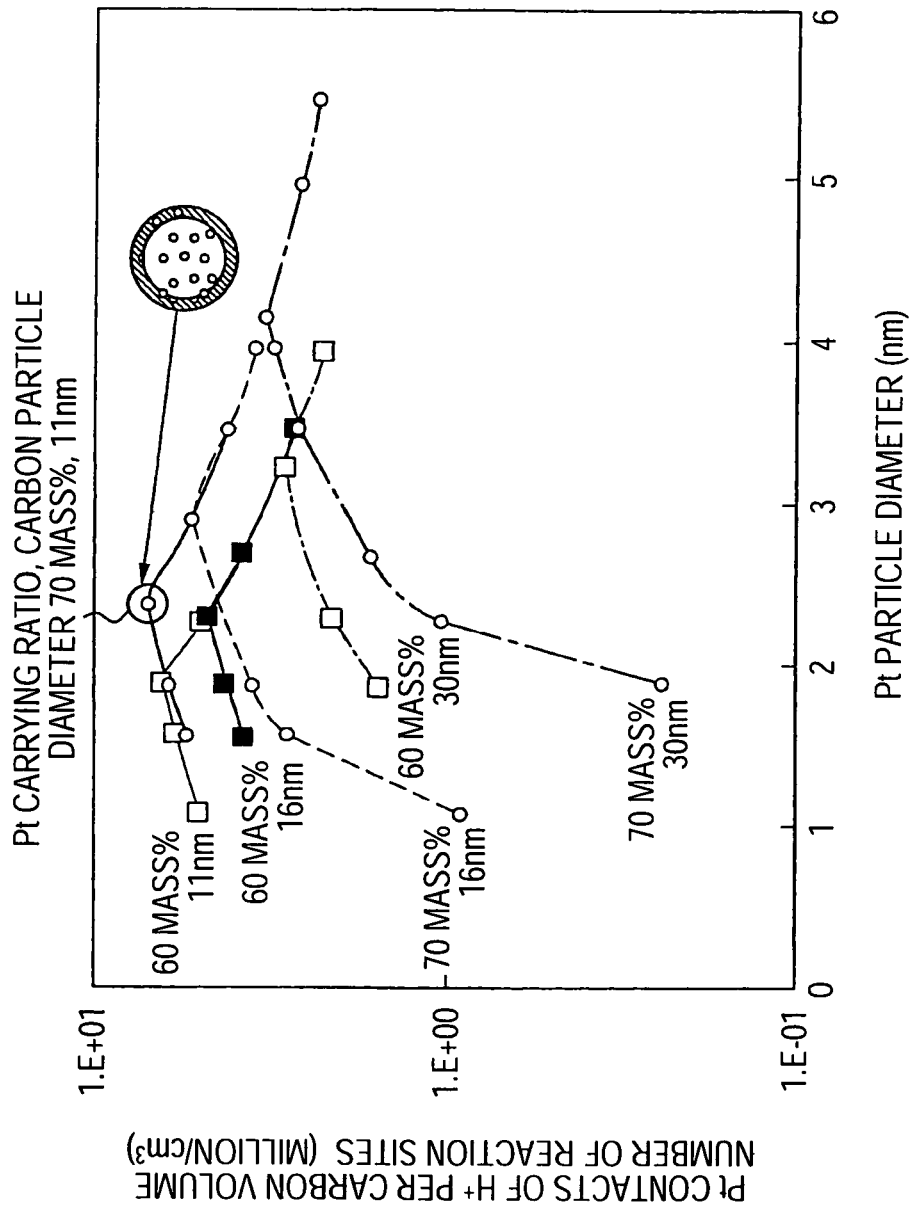
FIG. 14 is a graph illustrating a relation between the number of contacts of ion-exchange groups (reaction sites) per unit carbon carrier volume and Pt particle diameters.

FIG. 14 is a graph illustrating a relation between the number of contacts of ion-exchange groups (reaction sites) per unit carbon carrier volume, that is, the volume density of the reaction site and Pt particle diameters. Namely, FIG. 14 is a graph illustrating the results of a study made on a relation between the number of reaction sites per unit carbon carrier volume and the Pt particle diameter with various carbon particle diameters (11 nm, 16 nm, 30 nm) when Pt particles are carried on carbon with a high Pt carrying ratio (60 mass % or 70 mass %)

It is recognized from FIG. 14 that when Pt particles having an appropriate particle diameter are made to be carried with a high carrying ratio using a carbon particle, the number of reaction sites per unit carbon carrier volume (that is, the number of reaction sites per space in the event that ratios of carbon and space are aligned) can be increased by using carbon having a smaller particle diameter.

(Sixth Embodiment)

According to a sixth embodiment of the invention, there is provided a solid polymer electrolyte membrane fuel cell electrode catalyst layer as set forth in any of the first to fifth embodiments, wherein the diameter of the carbon carrier is smaller than 30 nm, wherein the Pt carrying ratio based on mass ranges from 30 to 70 mass % and wherein the diameter of the Pt particle ranges from 1 to 4 nm.

Figure 15:
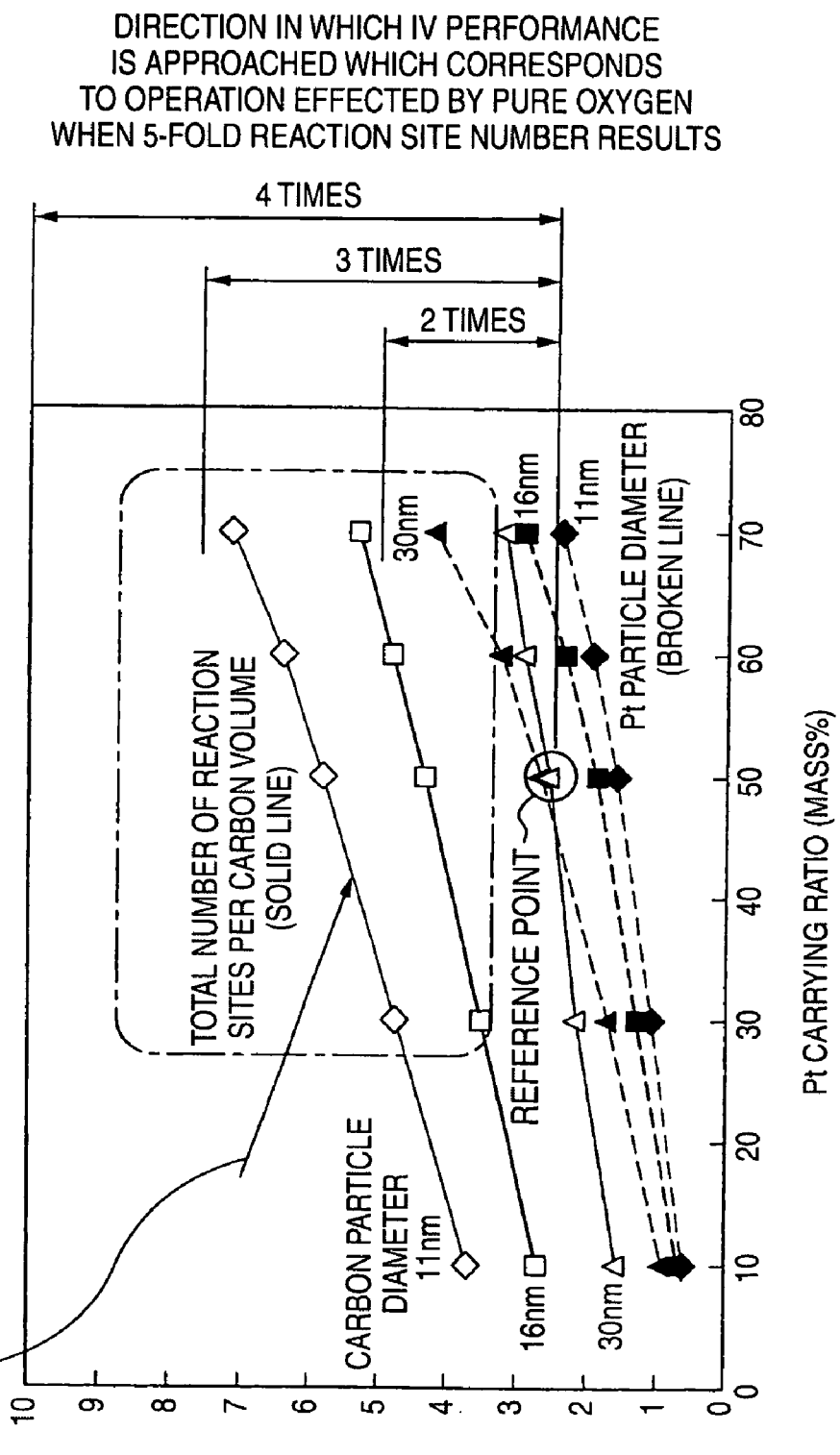
FIG. 15 is a graph illustrating a relation between the number of reaction sites per unit carbon carrier volume and the Pt carrying ratio (mass %)

The sixth embodiment will be described below based on FIG. 15. FIG. 15 is a graph illustrating a relation between the number of reaction sites per unit carbon carrier volume, that is, the reaction site volume density and the Pt carrying ratio (mass %). In FIG. 15, relations between the number of reaction sites per unit carbon carrier volume and the Pt carrying ratio (mass %) are compared and observed with the carbon particle diameter being changed (illustrated in solid lines in the drawing). In addition, in FIG. 15, relations between the number of reaction sites per unit carbon carrier volume and the Pt carrying ratio (mass %) are compared and observed with the Pt particle diameter being changed (illustrated in broken lines in the drawing).

Note that FIG. 15 is a graph illustrating a model of an optimum Pt particle arrangement which allows two pieces of polymer electrolyte PE to be just fitted between the Pt particles.

As shown in FIG. 15, it is recognized that the number of reaction sites increases substantially in proportion to an increase in Pt carrying ratio irrespective of the magnitude of both the carbon particle diameter and the Pt particle diameter. In addition, when observing carbon particle diameters, it is recognized that the number of reaction sites per space increases as the carbon particle diameter decreases. On the other hand, when observing Pt particle diameters, there is recognized a tendency that the number of reaction sites per space increases as the Pt particle diameter decreases. Consequently, it is recognized that in order to increase the number of reaction sites per space, the usage of carbon particles having smaller particle diameters and Pt particles having smaller particle diameters is effective while the Pt particle carrying ratio is increased.

In addition, in FIG. 15, a range is illustrated in an alternate long and short dash line where an improvement in the performance of the Pt can be expected with respect to reaction face.

Namely, when considering as a reference a Pt particle where Pt is carried on a carbon having a particle diameter of 30 nm, for example, with a carrying ratio of 50 mass %, the number of reaction sites per unit carbon carrier volume in this case becomes 2.5 million/cm$^3$. In contrast to this, in the event that a Pt particle is used where Pt is carried on a carbon having a particle diameter of 16 nm with a carrying ratio of 70 mass %, the number of reaction sites becomes 5.2 million/cm$^3$, which is almost double the referenced reaction site number above, and in the event that a Pt particle is used where Pt is carried on a carbon having a particle diameter of 11 nm with a carrying ratio of 70 mass %, the number of reaction sites becomes 7 million/cm$^3$, which is almost triple the above referenced reaction site number.

Thus, from the carbon particle diameter and Pt carrying ratio, indexes for increasing the catalyst performance (the number of reaction sites per unit carbon carrier volume) can be constituted. In addition, by using a carbon particle diameter and a Pt carrying ratio which can provide the number of reaction sites per unit carbon carrier volume which is substantially five times larger than that provided by the referenced carbon particle diameter and Pt carrying ratio, a similar catalyst performance to one that can be provided when pure oxygen is used can be attained using air.

Next, an example of the sixth embodiment according to the invention will be described based on FIG. 16.

Figure 16:
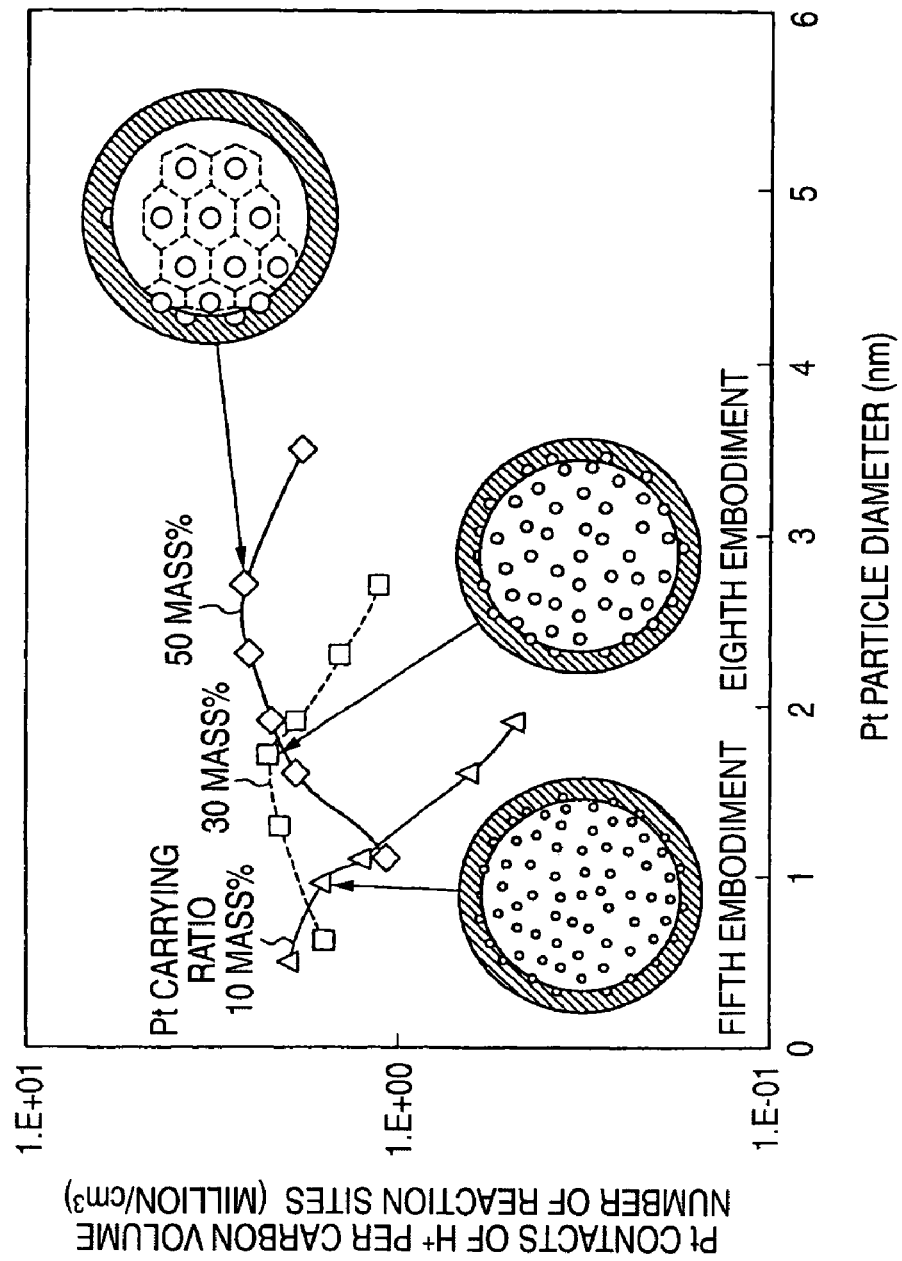
FIG. 16 is a graph illustrating a relation between the number of reaction sites per unit carbon carrier volume and the Pt particle diameter.

FIG. 16 is a graph illustrating a relation between the number of reaction sites per unit carbon carrier volume and the Pt particle diameter. In the graph shown in FIG. 16, a relation between the number of reaction sites per unit carbon carrier volume and the Pt particle diameter when with the carbon particle diameter being set to 30 nm, the Pt carrying ratio is changes to 10 mass %, 30 mass % and 50 mass %.

This example shows that with the carbon particle diameter being set to 30 nm, which is the upper limit in the fifth embodiment, since the unit carbon carrier volume increases even if the distance between particles is secured by micronizing the diameter of the Pt particle, there can be provided no effect. In other words, the example shows that there can be provided no effect even if the Pt particle is micronized directly based on the general concept in the related art.

It is recognized from FIG. 16 that by using the fine Pt particle calculated using the equation (33) which can increase the total number of reaction sites, the number of reaction sites per unit carbon carrier volume is decreased. This becomes more specific as the Pt carrying ratio decreases.

As has been described heretofore, the respective aspects of the invention can provide the following superior advantage.

According to the first to tenth aspects of the invention, it becomes possible to provide the solid polymer electrolyte membrane fuel cell electrode catalyst layer which is optimized with respect to the specification thereof, or, in other words, which is designed to have optimal dimensions so as to have a improved reactivity to thereby improve the power generating performance thereof or so as to maintain or improve the power generating performance thereof even if the amount of platinum used is reduced.

In addition, while, in order to facilitate the understanding of the invention, the case has been described where the catalyst particle is made up of platinum (the Pt particle), the invention can provide a similar advantage even if the catalyst particle is made up of an alloy formed of another element or a plurality of elements, which can easily be induced by those skilled in the art. It is also true with the material of the catalyst itself, and the invention may be applied to a catalyst formed of palladium (Pd), for example.

In addition, while the case has been described heretofore where the catalyst carrier is the carbon carrier, a similar advantage can be provided by the application of the invention, even if the catalyst carrier is made up of another element or a plurality of elements.

Furthermore, while the case has been described heretofore where the solid polymer electrolyte is formed from perfluorosulfonic acid, the invention may be applied to other solid polymer electrolytes (polymer electrolytes).

What is claimed is:

1. A solid polymer electrolyte membrane fuel cell electrode catalyst layer comprising:
   catalyst particles carried on a catalyst carrier; and
   a solid polymer electrolyte,
   wherein a center-to-center distance dimension (Lpt–pt) between the catalyst particles carried on the catalyst carrier is made to substantially coincide with the sum of a double of a total dimension resulting by adding the length (Lpes) of a side chain having an ion-exchange group to the radius (Dpem/2) of a main chain of the solid polymer electrolyte and the diameter (Dpt) of the catalyst particle.

2. A solid polymer electrolyte membrane fuel cell electrode catalyst layer as set forth in claim 1, wherein the diameter (Dc) of the catalyst carrier, the diameter (Dpt) of the catalyst particle, the radius (Dpem/2) of the main chain of the solid polymer electrolyte, the length (Lpes) of the side chain having an ion-exchange group and a catalyst carrying weight ratio (WRpt) of the catalyst particle carried on the catalyst carrier are such as to substantially satisfy the following equation;

$$Lpt\text{-}pt = Dpt + 2(0.5\ Dpem + Lpes) = \sqrt{(2 \cdot \Delta Sc/3\ \tan 30°)}$$

$$\Delta Sc = \pi \cdot \sigma pt \cdot Dpt^3/\sigma c \cdot Dc(1/WRpt - 1) = \pi \cdot Dc^2/Npt.$$

3. A solid polymer electrolyte membrane fuel cell electrode catalyst layer as set forth in claim 1, wherein the amount of the solid polymer electrolyte is such as to cover the catalyst particle substantially entirely.

4. A solid polymer electrolyte membrane fuel cell electrode catalyst layer as set forth in claim 1, wherein the catalyst carrier is a carbon carrier and the diameter (Dc) of the catalyst carrier is 30 nm or smaller, wherein the catalyst particle is a Pt particle and the diameter (Dpt) of the catalyst particle ranges from 0.6 nm or greater to 2.0 nm or smaller, and wherein a catalyst carrying weight ratio (WRpt) of the catalyst particle carried on the catalyst carrier is 30 wt % or smaller.

5. A solid polymer electrolyte membrane fuel cell electrode catalyst layer as set forth in claim 4, wherein the solid polymer electrolyte is formed from perfluorosulfonic acid.

6. A solid polymer electrolyte membrane fuel cell electrode catalyst layer as set forth in claim 5, wherein the length (Lpes) of the side chain of the solid polymer electrolyte is 1 nm or smaller, and wherein the length of a unit main chain of the solid polymer electrolyte is 3 nm or smaller.

7. A solid polymer electrolyte membrane fuel cell electrode catalyst layer as set forth in claim 1, wherein a ratio of a total number of the ion-exchange groups in the solid polymer electrolyte which contact the catalyst particles relative to a total volume of the catalyst carrier is made to become maximum.

8. A solid polymer electrolyte membrane fuel cell electrode catalyst layer as set forth in claim 7, wherein the catalyst carrier is a carbon carrier and the diameter (Dc) of the catalyst carrier is smaller than 30 nm, wherein the catalyst particle is a Pt particle and the diameter (Dpt) of the catalyst particle ranges from 1 nm or greater to 4 nm or smaller, and wherein the catalyst carrying weight ratio (WRpt) ranges from 30 mass % or greater to 70 mass % or smaller.

9. A solid polymer electrolyte membrane fuel cell electrode catalyst layer as set forth in claim 8, wherein the solid polymer electrolyte is formed from perfluorosulfonic acid.

10. A solid polymer electrolyte membrane fuel cell electrode catalyst layer as set forth in claim 9, wherein the length (Lpes) of the side chain of the solid polymer electrolyte is 1 nm or smaller, and wherein the length of a unit main chain of the solid polymer electrolyte is 3 nm or smaller.

* * * * *